United States Patent
Fimoff et al.

(10) Patent No.: US 8,576,966 B2
(45) Date of Patent: Nov. 5, 2013

(54) SYSTEMS AND METHODS FOR DETECTING TAMPERING WITH VIDEO TRANSMISSION SYSTEMS

(75) Inventors: Mark Fimoff, Hoffman Estates, IL (US); Khanh Lam, San Jose, CA (US); Dennis Mutzabaugh, Mount Prospect, IL (US); David Ritter, San Jose, CA (US); Greg Tomezak, Buffalo Grove, IL (US)

(73) Assignee: Techwell, Inc., San Jose, CA (US)

( * ) Notice: Subject to any disclaimer, the term of this patent is extended or adjusted under 35 U.S.C. 154(b) by 285 days.

(21) Appl. No.: 13/229,596

(22) Filed: Sep. 9, 2011

(65) Prior Publication Data

US 2012/0086813 A1 Apr. 12, 2012

Related U.S. Application Data

(63) Continuation-in-part of application No. 12/698,037, filed on Feb. 1, 2010, now Pat. No. 8,369,435, and a continuation-in-part of application No. 12/698,041, filed on Feb. 1, 2010, and a continuation-in-part of application No. 12/698,061, filed on Feb. 1, 2010, now Pat. No. 8,422,611, and a continuation-in-part of application No. 12/698,066, filed on Feb. 1, 2010, now Pat. No. 8,374,270, and a continuation-in-part of application No. 12/698,071, filed on Feb. 1, 2010, now Pat. No. 8,428,188.

(60) Provisional application No. 61/495,287, filed on Jun. 9, 2011.

(51) Int. Cl.
*H04B 1/10* (2006.01)

(52) U.S. Cl.
USPC .................. 375/350; 375/346; 375/316

(58) Field of Classification Search
USPC ....................................... 375/350
See application file for complete search history.

(56) References Cited

U.S. PATENT DOCUMENTS

| 4,151,490 A | 4/1979 | Bazin |
| 5,559,808 A | 9/1996 | Kostreski et al. |

(Continued)

FOREIGN PATENT DOCUMENTS

| EP | 0611059 | 8/1994 |
| GB | 466 092 | 5/1937 |

(Continued)

OTHER PUBLICATIONS

Stewart, J., "Calculus" Third Edition, Copyright 1995 by Brooks/Cole Publishing Company, ISBN 0 534-021798-2, pp. 100-109.
European Search Report for European Patent No. EP 2182647, dated Apr. 23, 2010.
Partial European Search Report for European Patent Application No. EP 09174643, dated Mar. 3, 2010.
International Search Report for PCT/US2010/022772, dated Jun. 7, 2010.

(Continued)

*Primary Examiner* — Erin File
(74) *Attorney, Agent, or Firm* — Anthony Smyth; Loza & Loza, LLP

(57) ABSTRACT

Systems and methods for controlling transmission of signals are described. A camera-side modem is configured to receive two signals from a video camera and to extract a received passband signal from a transmission line. A detector in the camera-side modem generates an alarm signal when disruption or loss of the received passband signal is identified. An enable signal is used to control transmission of at least one of the baseband video signal and the passband video signal. The passband signal may be identified by an estimate of mean square error in a quadrature amplitude demodulator, a measurement of reliability provided by a constellation detector, a measurement of reliability based on a sequence of frame synchronizations and/or an estimate of mean square error in an equalizer. The detector may monitor a gain factor in an automatic gain control module of the camera-side modem and/or a magnitude of the received passband signal.

20 Claims, 19 Drawing Sheets

(56) References Cited

U.S. PATENT DOCUMENTS

| | | | |
|---|---|---|---|
| 6,882,634 B2 | 4/2005 | Bagchi et al. | |
| 7,003,030 B2 | 2/2006 | Abdelilah et al. | |
| 7,089,577 B1 | 8/2006 | Rakib et al. | |
| 7,221,389 B2 | 5/2007 | Ahem et al. | |
| 7,248,841 B2 | 7/2007 | Agee et al. | |
| 2002/0027886 A1* | 3/2002 | Fischer et al. | 370/255 |
| 2002/0057713 A1* | 5/2002 | Bagchi et al. | 370/468 |
| 2002/0163932 A1* | 11/2002 | Fischer et al. | 370/465 |
| 2005/0134748 A1 | 6/2005 | Hoerl | |
| 2006/0245517 A1 | 11/2006 | Ikedo et al. | |
| 2007/0052849 A1 | 3/2007 | Craddock et al. | |
| 2007/0296868 A1 | 12/2007 | Hall | |

FOREIGN PATENT DOCUMENTS

| | | |
|---|---|---|
| JP | 05-184065 | 10/1993 |
| JP | 05-284064 | 10/1993 |
| WO | WO 03/071804 | 8/2003 |

OTHER PUBLICATIONS

Intersil; Sync Separator Horizontal Output; Data Sheet; Jul. 26, 2004; 9 pages; FN7010.1.

Intersil; 100MHz Differential Twisted-Pair Drivers; Data Sheet; Oct. 29, 2004; 13 pages; FN7309.5.

Intersil; Differential Receiver/Equalizer; Data Sheet; Jul. 15, 2005; 8 pages; FN7305.4.

Intersil; 170MHz Triple Video Digitizer with Digital PLL; Data Sheet; Jun. 6, 2005; 29 pages; FN8218.0.

Intersil; CAT-5 Video Transmission; Troubleshooting and Equalization; Application Note; Aug. 2, 2007; 8 pages; AN1307.0.

Intersil; Differential Receiver/Equalizer; Data Sheet; Nov. 30, 2007; 10 pages; FN7305.5.

Intersil; Transmitting SXGA Video Signal Through 1kft (300m) CAT-5 Cable; Application Note; Jan. 2, 2008; AN1318.0.

Pearson, J., "Adjustable Cable Equalizer Combines Wideband Differential Receiver with Analog Switches," Analog Dialogue 38-07, pp. 1-4 (Jul. 2004).

\* cited by examiner

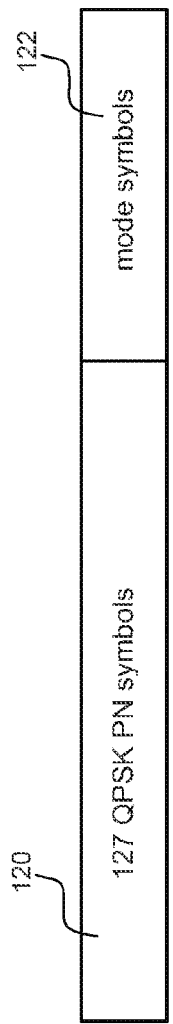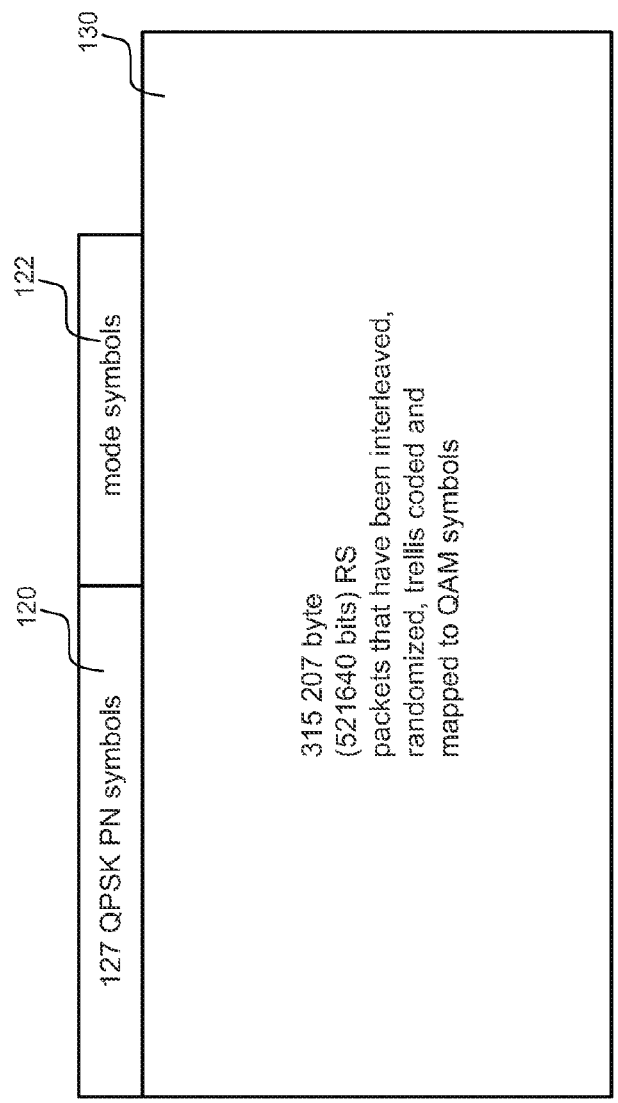

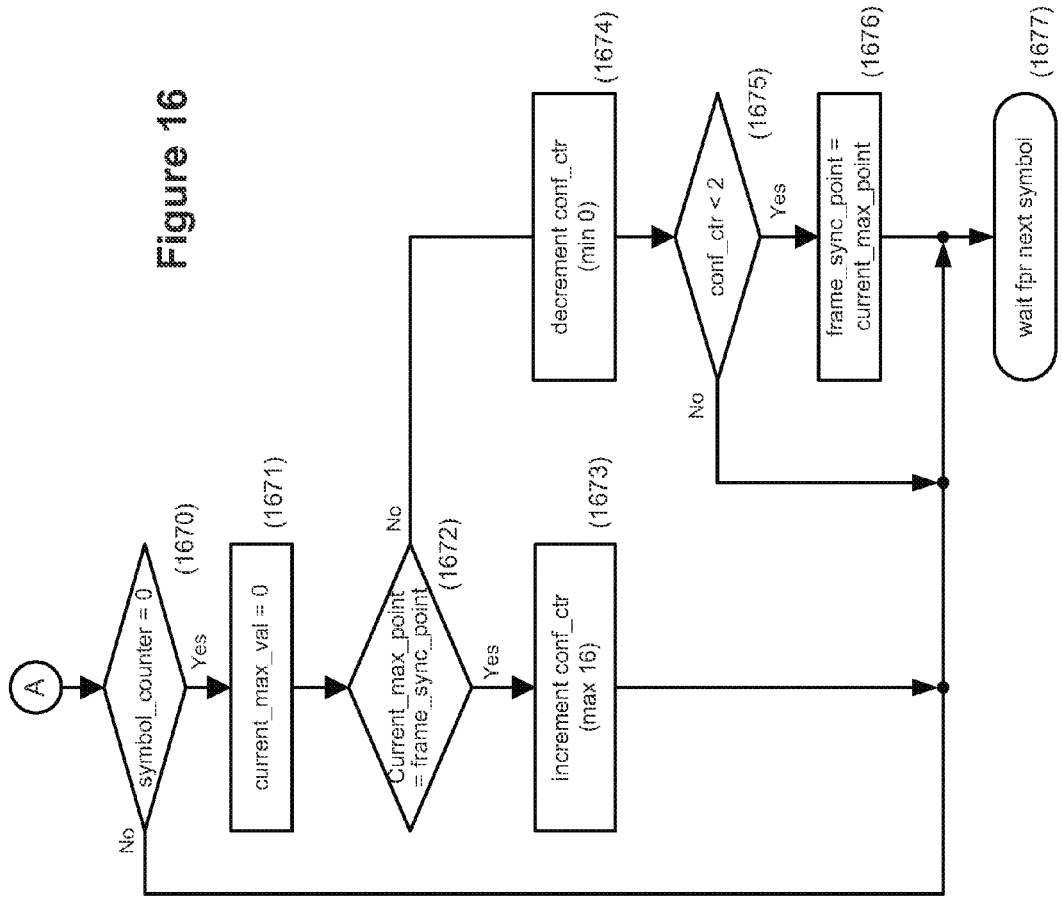
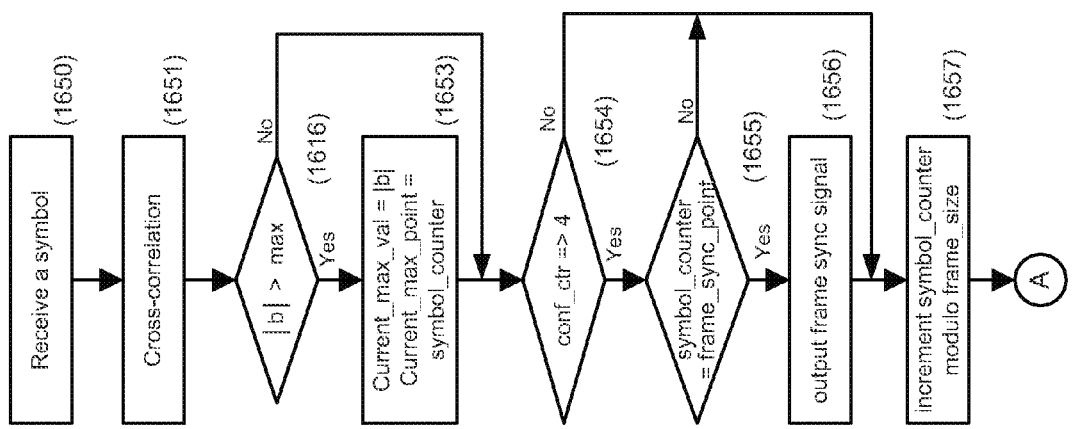
Figure 16

LUT operation:

| Sign of max $b_R$ | Sign of max $b_I$ | $\phi$ |
|---|---|---|
| + | + | 0 |
| − | + | $+\frac{\pi}{2}$ |
| − | − | $+\pi$ |
| + | − | $-\frac{\pi}{2}$ |

← 1804

SYSTEMS AND METHODS FOR DETECTING TAMPERING WITH VIDEO TRANSMISSION SYSTEMS

CROSS-REFERENCE TO RELATED APPLICATIONS

The present application is a continuation-in-part of U.S. patent application Ser. No. 12/698,037 now U.S. Pat. No. 8,369,435, Ser. No. 12/698,041, Ser. No. 12/698,061 now U.S. Pat. No. 8,422,611, Ser. No. 12/698,066 now U.S. Pat. No. 8,374,270, Ser. No. 12/698,071 now U.S. Pat. No. 8,428,188, each of which was filed on Feb. 1, 2010, and of U.S. Provisional Patent Application No. 61/495,287, which was filed on Jun. 9, 2011, all of these applications being incorporated herein by reference.

The present Application is related to commonly owned U.S. patent application Ser. No. 12/363,669, filed Jan. 30, 2009, which is incorporated herein by reference and is also related to commonly owned U.S. patent application Ser. No. 13/228,823, which was filed Sep. 9, 2011.

BRIEF DESCRIPTION OF THE DRAWINGS

FIG. 12 is an example of a portion of a frame-sync/mode symbol packet according to certain aspects of the invention.

FIG. 13 illustrates a frame structure prior to processing by a passband modulator according to certain aspects of the invention.

FIG. 16 comprises a flowchart of an algorithm used by a frame sync module to produce frame sync pulses.

DETAILED DESCRIPTION OF THE INVENTION

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the descriptions herein are intended to encompass other embodiments including a plurality of the same component, and vice-versa, unless explicitly stated otherwise. Moreover, applicants do not intend for any term in the specification or claims to be ascribed an uncommon or special meaning unless explicitly set forth as such. Further, embodiments of the present invention encompass present and future known equivalents to the components referred to herein by way of illustration.

Certain embodiments of the invention provide systems and methods for monitoring signals transmitted over coax cables for symptoms or indicators of tampering, cable damage or other causes of signal loss or loss of signal quality. By monitoring certain aspects of the signal processing described herein, video feeds can be protected from inadvertent and deliberate disruption and attempted interceptions of video feeds can be detected. In certain embodiments, coax cables used in security link over coax ("SLOC") systems, as well as other types of cable, can be monitored for disruptions and degradation in signaling feeds in both upstream and downstream directions, including baseband and passband signals. Modems used to modulate and demodulate passband signals can be adapted to generate signals related to equalization, modulation and demodulation and other functions of the modems upon detection of signal deterioration and/or variation from observed historical cycles of the signals.

Figure 26:
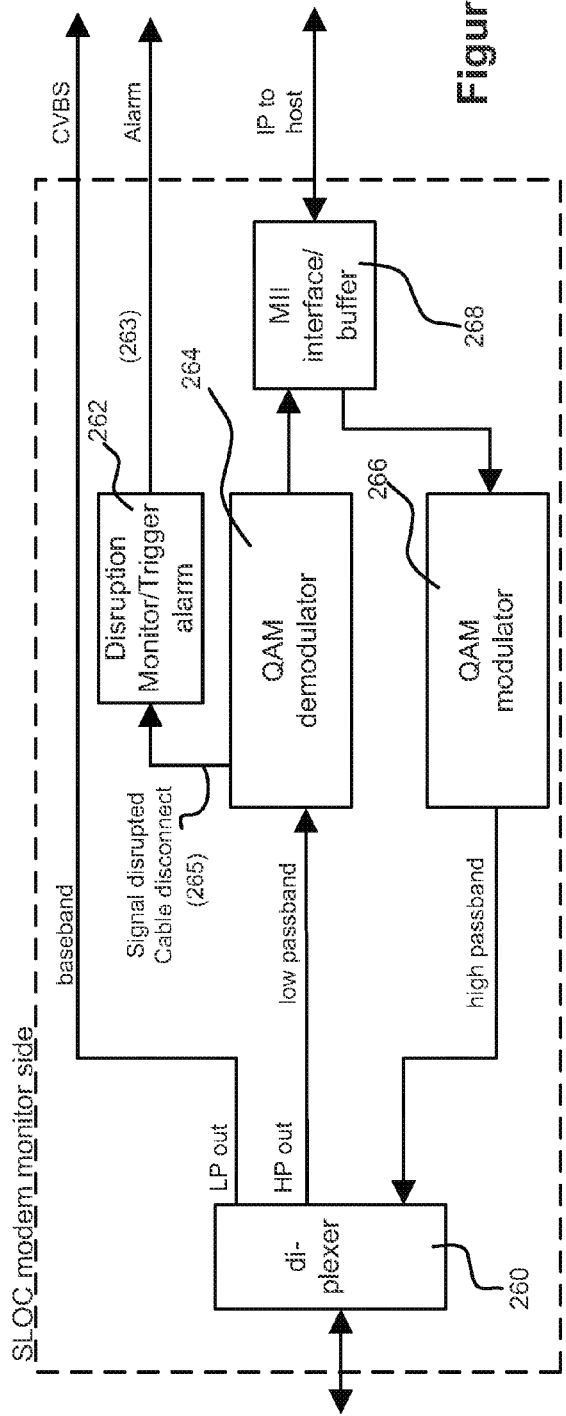
FIG. 26 depicts an example of alarm generation according to certain aspects of the invention.

In certain embodiments, a monitor-side SLOC QAM demodulator can be adapted to trigger an alarm in response to detection of a cable disconnection or disruption of a signal carried by the cable. Disruptions can include abnormal and/or prolonged signal loss or degradation that necessitates recalibration of decoding processes or resynchronization of receivers. For example, QAM demodulator 264 shown in FIG. 26 can be adapted to produce a signal 265 that indicates loss (cable disconnect) or change (signal disruption) in a received passband signal. Signal 265 may comprises a plurality of signals, each indicating a different condition. Signal 265 may comprise a code word that identifies a condition. Signal 265 may be provided to an alarm module 262 that determines if an alarm condition exists and generates an alarm 263 accordingly. Changes in the modulated signal can be identified through, for example, increased or decreased detected noise, changes in phase shift, loss of synchronization, changes in confidence metrics, changes in attenuation, temporary/permanent complete loss of signal and/or changes in other characteristics that are monitored or measured by the QAM demodulator 264.

In certain embodiments, alarm triggering methods use a time component to determine persistence of signal disruption, where disruption or disconnection can result from intermittent noise. For the purposes of describing these examples, the time component may employ a measured time $t_d$ that represents a specified duration of time before a disruption of disconnection is determined to have occurred. In certain embodiments, the time interval $t_d$ an be configured according to application needs and detection method used. Some methods of detection can filter out the effects of noise and environmental variables and can use a sub-second time interval $t_d$. Sub-second time interval $t_d$ can be used in certain SLOC-based embodiments described herein. However, in certain embodiments that use a low pass filter is for bop filtering, $t_d$ must be relatively larger since very short term changes may not be observable. In some embodiments, time interval $t_d$ may be measured in seconds or minutes.

Figure 27:
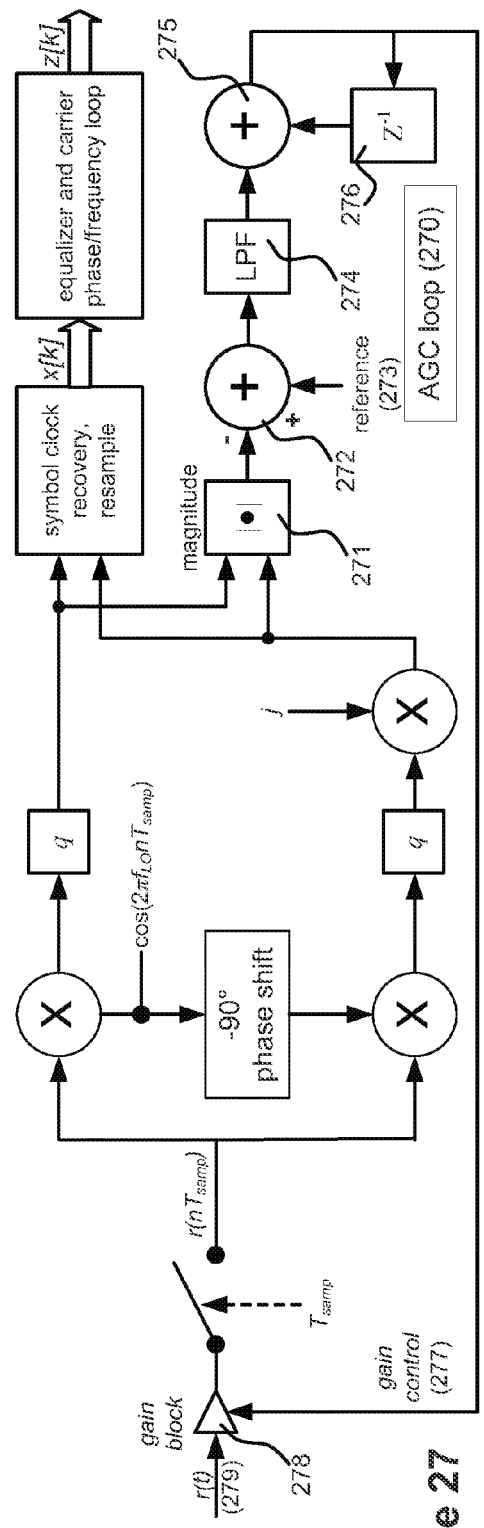
FIG. 27 depicts an example of alarm generation using an automatic gain loop according to certain aspects of the invention.

Certain embodiments detect signal disruption based on loop performance in an automatic gain control ("AGC") element. Communications receivers according to certain aspects of the invention, including receivers that have a QAM demodulator, may comprise an automatic gain control (AGC) element to control signal levels at various points in the receiver. FIG. 27 shows an example of an AGC element used with a monitor side passband to baseband QAM demodulator (see also FIG. 21). The AGC loop typically operates by determining the magnitude of a complex signal and then subtracting the magnitude from a predetermined reference level. The result is filtered using a low pass filter ("LPF") 274 to suppress noise and short term variations. The LPF output feeds an accumulator comprising an adder 275 and a delay element 276. The accumulator output is used as a gain control signal 277, which is fed back to a gain block 278 at the system input 279.

When a cable carrying a received signal is disconnected, or the signal is disrupted, the magnitude block 271 output tends to be very low and gain control signal increases to a high level. In one embodiment, a signal 265 may be asserted to indicate cable disconnected when the magnitude block 271 output drops below a predetermined threshold and this condition is sustained for at least $t_d$. Magnitude block 271 output may be determined based on the level of gain control signal 277. Thus, signal 265 may be asserted if the gain control signal 277 rises above a predetermined threshold and this condition is sustained for at least $t_d$. Gain control signal 277 offers the advantage that variations detected in signal amplitude are low pass filtered to account for short term variations and noise before impacting gain control signal 277. A longer time period for $t_d$ can be set when the gain control signal 277 is used to detect disruptions, because short term effects have typically been suppressed. In certain embodiments, time period $t_d$ may be measurable in seconds, but can be reduced to milliseconds or less to enable fast detection of signal loss or disruption.

Signal 265 may be asserted to indicate occurrence of a signal disruption event based on changes in the gain control 277 that include repetitive changes, which can be caused by sudden degradation in signal quality. A series of disruptions occurring over seconds or even minutes may indicate tampering component failures leading to apparent cable disruptions. Increases in gain control 277 followed within seconds by a decrease in gain control 277 may indicate a temporary disconnection of the cable has occurred. These and other changes in gain control 277 may be indicative of tampering that ultimately results in attenuation of signals rather than loss of signal. Certain monitoring thresholds may be set for gain control 277 and/or output amplitude to identify which changes in the input signal are significant and/or unexpected. Depending on noise and other environmental conditions, the thresholds may be set to a few percentage point changes or to 10% or greater changes in signal amplitudes or gain control 277.

Environmental changes, such as changes in temperature, humidity, etc., can cause changes in cable attenuation that can be detected through cyclic increases or decreases in gain control. Such cyclic changes tend to have a long period of oscillation: for example, temperature-related changes may cycle over several hours or days, depending on physical location of the cable. In certain embodiments, time-varying threshold values can be configured and tolerances can be set to accommodate expected or predictable variations in attenuation, whether cyclic or otherwise. In certain embodiments, a determination of tampering may made when the rate of change of gain control 277 is significantly faster than environmental cycles.

Certain embodiments can employ an AGC loop elsewhere in a QAM demodulator including, for example, in a receiver, in baseband amplifiers and signal processors and elsewhere in the modem or in a cable interface. These additional AGC loops can be used to detect cable disconnects and signal disruptions. The use of different AGC elements can reduce false alerts in certain environments; for example, if significant noise is present in passband signals on a coaxial cable, an AGC element used in elements that process baseband signals transmitted with the passband signal over the coaxial cable may generate fewer false alerts.

Aspects of the invention can be applied in systems that support standard definition video and high definition video, as well as analog and digital encoding of such video signals. With the advent of digital broadcast television and streaming video technologies various video cameras, monitors and video recorders have become available with enhanced resolution and advanced features. Closed circuit television (CCTV) systems now offer high definition video outputs and compressed digital video signals for use in applications such as premises surveillance, access control and remote monitoring of facilities. Legacy systems providing standard definition analog video signals are in widespread use and will continue to be used during the transition to all-digital, high-definition systems. Coax has been extensively deployed to carry signals from analog CCTV cameras to monitoring stations. Some deployed CCTV cameras transmit compressed digital video signals over local area networks, and these cameras may use the Internet Protocol (IP) as a communications means for transmitting the compressed video signal over category 5 (CAT5) twisted pair cable.

Figure 1:
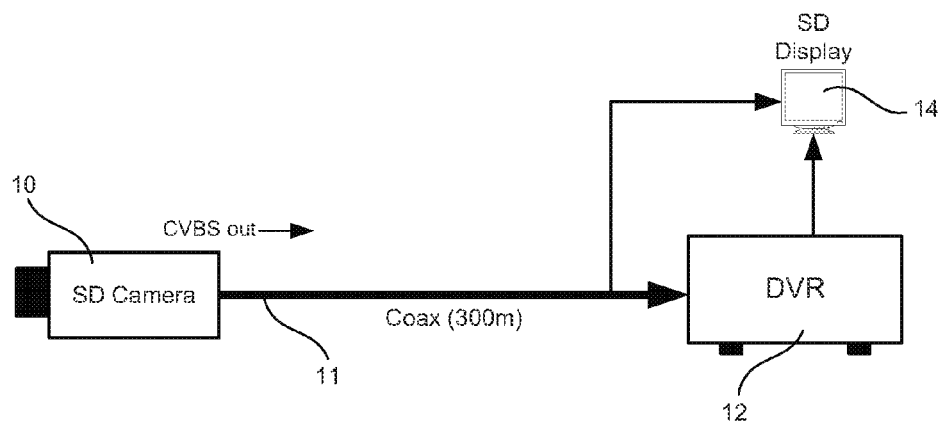
FIG. 1 illustrates conventional systems use of coaxial cable (coax) to carry standard definition ("SD") analog video.

FIG. 1 illustrates one conventional system that uses coax to carry standard definition analog video. An analog camera 10 typically generates a composite video baseband signal ("CVBS") that can be transmitted over a distance of 300 meters or more using coax 11. The CVBS signal can be provided to a video recording system which may comprise a digital video recorder ("DVR") 12 that digitizes the CVBS signal and records it. A monitor or display device 14 may be connected directly to coax 11 to display live standard definition ("SD") video, and to the DVR 12 for playback of recorded video. SD video typically has a resolution of 720× 480 pixels.

Figure 2:
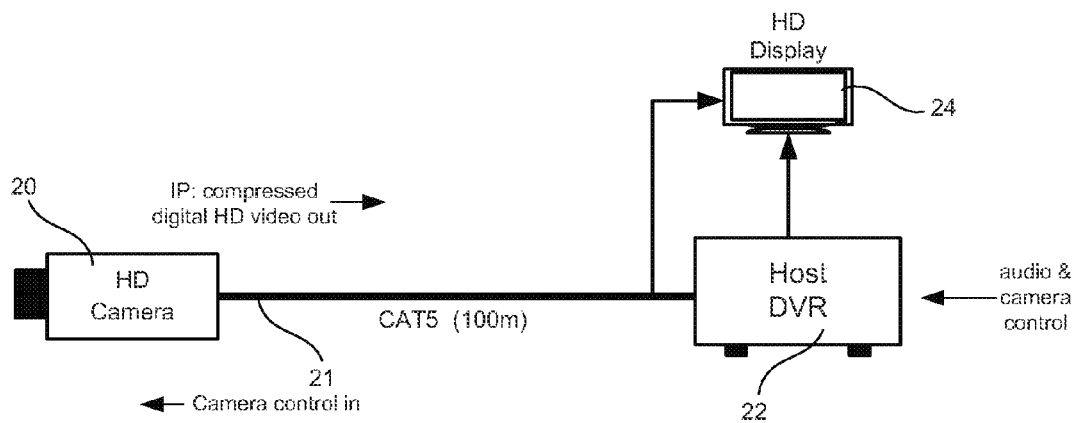
FIG. 2 illustrates conventional approaches to transmitting high definition video.

FIG. 2 illustrates one system that can be employed in currently deployed systems for transmitting high definition (HD) video, with a resolution of 1920×1080 pixels, for example. An IP-based, HD camera 20 may generate a compressed digital HD video signal using 100 Mbps Ethernet over standard CAT5 twisted pair cable 21, typically at distances of up to 100 meters. The signal is received by a device comprising a host processor, and/or DVR 22. The signal may also be received by an HD Display 24 that is equipped to decode the HD video signal from the Ethernet cable 21. The HD video can be viewed live and also recorded for non-real time playback. The use of IP networking enables camera 20 to transmit digital video and allows for upstream communications from the monitor/display side 22, 24 back to camera 20 or camera-side equipment; such upstream communications may include camera control and audio signals. Live video extracted from the Ethernet cable 21 may suffer from delay due to latency in the IP network and/or due to the time needed for the host processor to reconstruct the compressed digital video. The use of IP communications can also enable the use of networking tools, such as routers, to enable the combination of data packets received from multiple cameras and may permit DVR recording and monitoring in remote network connected locations.

Certain embodiments provide systems and methods that enable detection of disruption, tampering and/or tapping of a combined video signal feed. In the example of a SLOC system shown in FIG. 3, video feeds from HD camera 30 can include one or more simultaneous high-definition digital video signal and a standard definition analog video signal that combined and transmitted over coax 31. HD camera 30 may be adapted to produce a compressed digital video signal and an analog baseband signal. The digital signal can be modulated and transmitted in a band of frequencies separated from the upper frequencies of the baseband video signal. The digital signal may be modulated, for example, according to a quadrature amplitude modulation ("QAM") scheme. The analog signal may be encoded according to any desired standard, including PAL, SECAM and NTSC standards and their variants. The coax cable 31 may also carry one or more upstream band-pass signals.

Figure 3:
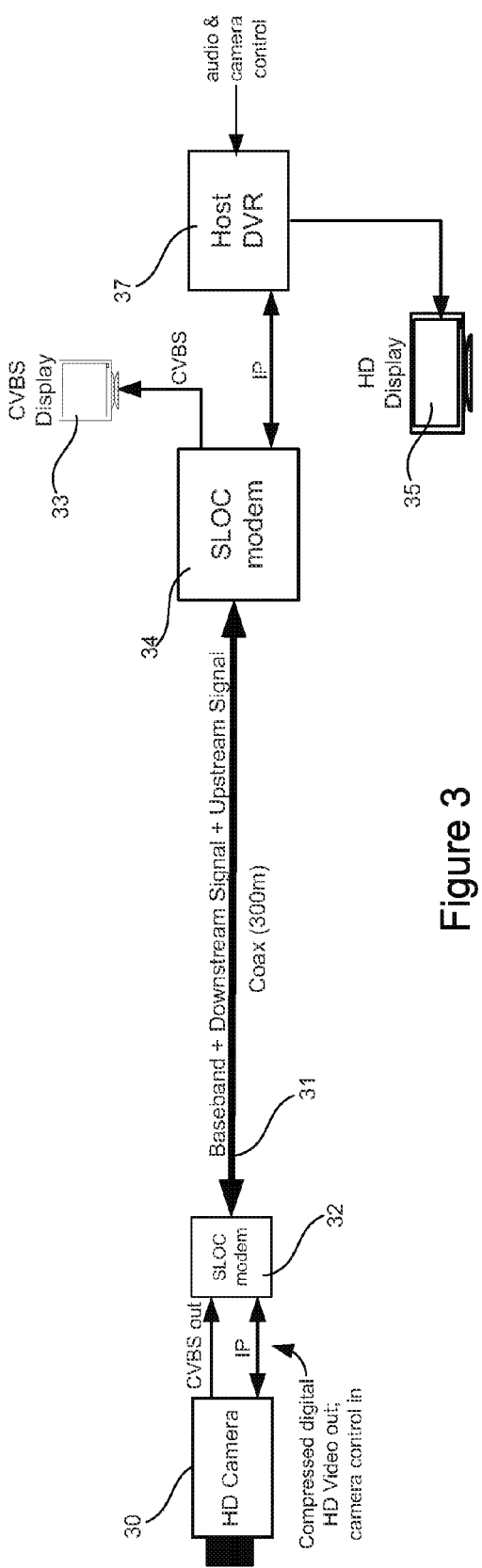
FIG. 3 is a simplified depiction of a security link over coax ("SLOC") system employed in certain embodiments of the invention.

In the embodiment illustrated in FIG. 3, HD camera 30 may provide both an IP output comprising compressed digital HD video, and an auxiliary camera output comprising analog SD CVBS. The compressed HD video IP signal is modulated to passband utilizing a SLOC camera side modem 32, which can comprise a QAM modulator. The compressed HD video IP signal is combined with the baseband analog CVBS signal and the combination of passband and baseband signals may be transmitted downstream over coax 31. At the monitor side, SLOC monitor side modem 34 separates the baseband CVBS signal from the passband downstream IP signal. The CVBS signal may be provided to an SD display 33 for delay-free live viewing of the output of HD camera 30. The passband downstream IP signal may be demodulated using a QAM demodulator which optionally outputs signals to DVR 37 or another video processing device. The SLOC modem 34 may provide decoded HD signal for live HD viewing and can record compressed or decompressed HD video signals on DVR 37 for later viewing on HD display 35.

Certain embodiments support upstream communications as required by the IP protocol, and for sending audio and camera control signals from the monitor side to the camera side. Typically, the bandwidth required for the upstream passband signal may be much lower than the bandwidth required for the downstream passband signal. The monitor side SLOC modem 32 may include a QAM modulator that modulates the IP signal to a desired passband frequency. At the camera side, the SLOC modem 32 may include a QAM demodulator for receiving the upstream signal. The QAM modulator in modem 32 may be adapted to detect cable disconnects and signal disruptions in accordance with certain aspects of the invention.

In certain embodiments upstream and downstream signals transmitted over coax 31 can be monitored for indications of tampering. In certain embodiments, a disruption monitor 262 (FIG. 26) can cooperate with camera side modem 32 to monitor upstream signal 44 for changes indicative of tampering or other disruptive events. In certain embodiments, disruption monitor 262 can cooperate with display side modem 34 to monitor downstream passband signal 42 and/or baseband signal 40 for changes indicative of tampering or other disruptive events. Baseband signals may be monitored by observing automatic gain control signals and filter taps in baseband equalizers to detect disruptions and/or tampering.

In certain embodiments, a processor in the modem, a display monitor, a DVR or other host equipment may be configured to maintain a record of a modem configuration and certain aspects of its operation. The record may include sampled or measured values, changes in values, trends, averages and information related to cycles of changes in coax characteristics. Thus, an indication of disruption of one or more signals and/or tampering with coax may take into consideration variations in environmental conditions that can result in changes to equalizer filter taps, for example. Records can be stored or aggregated in a network server to permit trend and other analysis that can be used to improve detection and/or prediction of cable disconnections and signal disruptions. Information gathered in one SLOC system can be used to predict expected values, changes in values, trends, averages and information related to cycles of changes in coax characteristics for other similar systems.

In certain embodiments, parameters can be maintained in a table, where the parameters include, for each of a plurality of times, values representative of the level of equalization of one or more bands, including passbands and baseband. Such values may represent values captured at any desired rate; for example, some parameters may be recorded in intervals measured in seconds, minutes, hours, days and/or weeks, based on the degree of modeling of coax performance desired. Changes in one or more of these values beyond a corresponding threshold can be interpreted as being indicative of potential tampering and/or degradation of a cable and/or video signal, and can be used to trigger an alert. Relatively slow changes in one or more of these values can be caused by cable aging, temperature and weather effects, and/or equipment aging. In some embodiments, rapid changes in one or more of these values may be more likely be due to an intentional intrusion (e.g., where an intruder tapped into a cable and/or added an additional length of cable), a failure in a cable path, or a failure in (or change of) a video camera. In some embodiments, transitory, rapid changes can indicate intrusion where the system recovers quickly.

In certain embodiments, monitoring element 262 can be configured to trigger an alarm signal 263 in response to detecting signal disruption or cable disconnection, using the stored values to identify a change in at least one type of value that exceeds a corresponding threshold. Different thresholds can be used for different types of values. For example, there can be a high band equalization threshold, a low band equalization threshold, and a DC gain threshold. Each threshold can be a programmed value (e.g., 30) or a programmed percentage (e.g., 20%) that indicates an extent of change that triggers an alarm signal 263. It is also possible that there is more then one threshold for each type of value, e.g., there can be two different high band equalization thresholds. A change in the high band equalization exceeding a first threshold can be indicative of cable or signal degradation, whereas a change exceeding a second higher threshold can be indicative of an intentional intrusion, a failure in a cable path, or a failure in (or change of) a video camera.

In certain embodiments, an alert is triggered in response to a threshold being exceeded. Alternatively, an alert can be triggered in response to detecting a change in one or more types of value (e.g., high band equalization) that exceeds a corresponding threshold within a predetermined amount of time (e.g., 12 hours). In one example, disruption monitor 262 may trigger an alert if the value indicates high band equalization changes exceeding a minimum percentage (e.g. 20-30%) from one 12 hour time period to the next. In another example, an alert is triggered in response to detecting a rate of change in a type of value that exceeds a corresponding threshold.

Alarm signal 263 can cause an alert that may be an audible alert and/or a visual alert. In certain embodiments, alarm signal 263 may cause an alert to be saved in a recorded log. In certain embodiments, alarm signal 263 may cause an Email, text message and/or phone call to be transmitted to one or more individuals and/or departments responsible for the security or maintenance of a surveillance system. In certain embodiments, alarm signal 263 may generate an alert that includes information that can inform a system and/or person of a potential problem. The information may include details of a cause or suspected cause that triggered the alert.

Certain embodiments assert signal 265 (FIG. 26) in to identify signal disruption and/or cable disconnect based on errors detected in higher layer communication protocols. As discussed herein, HD camera 30 at the camera side and a host system such as DVR 37 at the monitor side may communicate using IP. A communications processor or software at the host 37 may indicate that a loss of signal has occurred when IP packets are lost. Under certain conditions, packet loss may be determined to be caused by cable disconnection or other signal disruption in cable 31. Since packets may be lost as a result of collisions, apparent collisions, impulse noise, or for other reasons, the host system 37 may count the number or rate of packet loss within a predetermined window of time before asserting either a cable disconnected or signal disruption condition on signal 265. For example, the loss of a certain of packet may be due to network interface or application error and such losses may be discounted if other packets are successfully transmitted in the same time frames. Furthermore, the cable disconnected condition may be asserted after complete loss of communications has occurred for a predetermined time $t_d$. Signal disruption may be indicated when packet error rates increase or are sustained for a predetermined time. Error rates can include dropped packets, and apparent collisions when none should be present.

Figure 4:
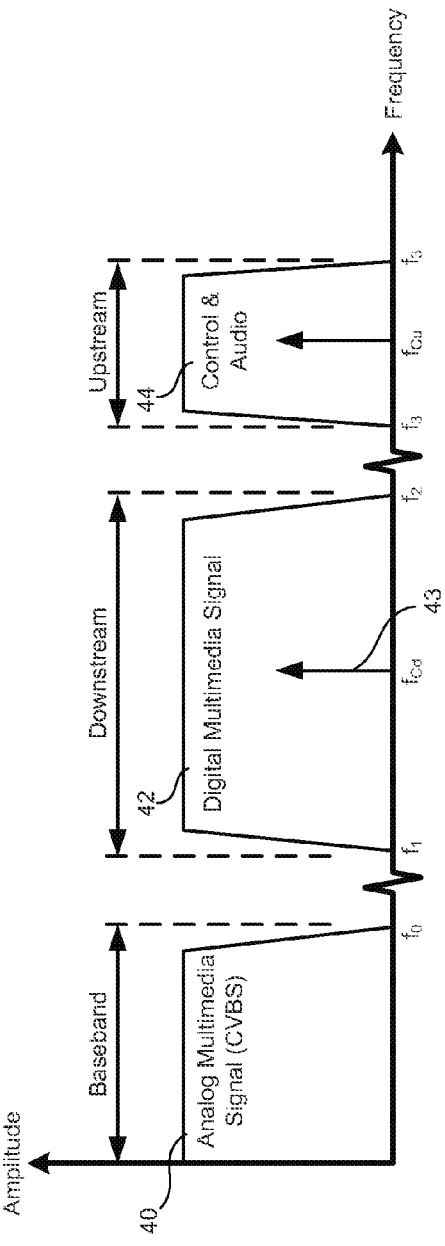
FIG. 4 is an example of bandwidth allocation for the system depicted in FIG. 3.

In certain embodiments, the downstream and upstream moderns can be identical, although the modems may be configured differently to account for the spectral locations and bandwidths for their respective transmitted and received signals. FIG. 4 shows an example of bandwidth allocation for a SLOC system. The upstream passband signal is typically located at a different spectral location 44 than the spectral location 42 of the downstream passband signal. The disclosed SLOC system can provide advantages over conventional systems, including operation over greater distances, easy integration with existing coax infrastructure and real-time CVBS video display.

Figure 5:
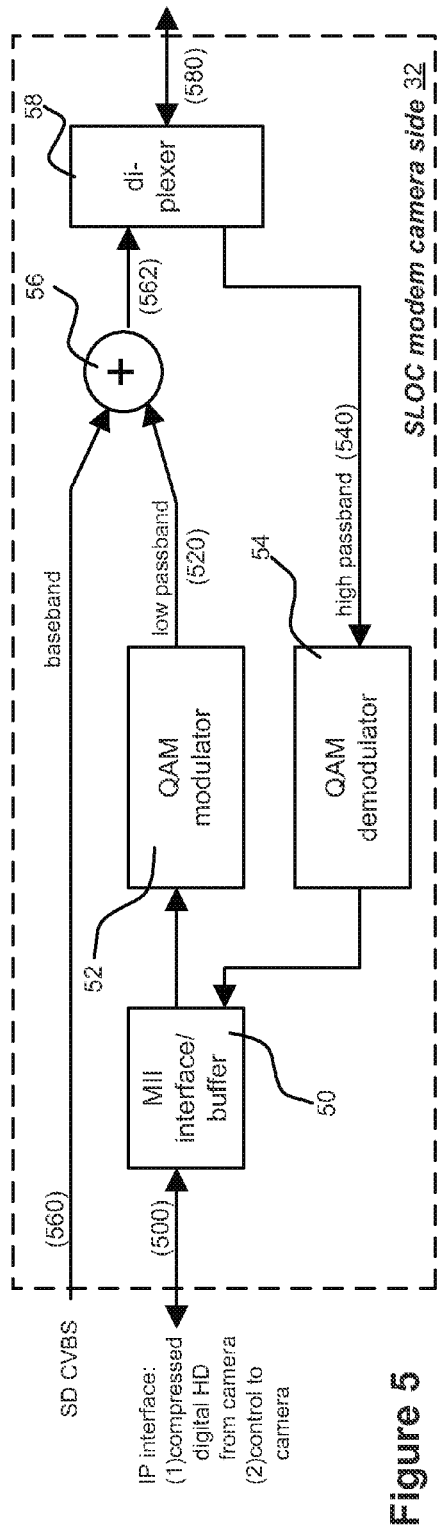
FIG. 5 is a block schematic of a security link over coax camera side modem according to certain aspects of the invention.

FIG. 5 depicts certain aspects of the SLOC camera side modem 32 shown in FIG. 3 in more detail. The IP connection to the HD camera can be interfaced to the QAM modulator 52 and demodulator 54 through a media independent interface ("MII") module 50, such as an MII according to the well-known IEEE 802.3 standard. QAM modulator 52 operates to convert the baseband IP data stream 500 into passband QAM symbols 520. These are summed at adder 56 with the baseband CVBS signal 560 and then fed to a diplexer 58. The diplexer can be a 2-way analog device that passes the combined baseband 560 and low passband downstream signals 520 to the coax 580. Diplexer 58 may also receive the high passband upstream signal 540 from coax 580 and feed it to QAM demodulator 54 which, in accordance with well-known principles, can demodulate the high passband upstream signal 540 from the monitor side and which may provide an output of baseband data to the MII interface 50.

Figure 6:
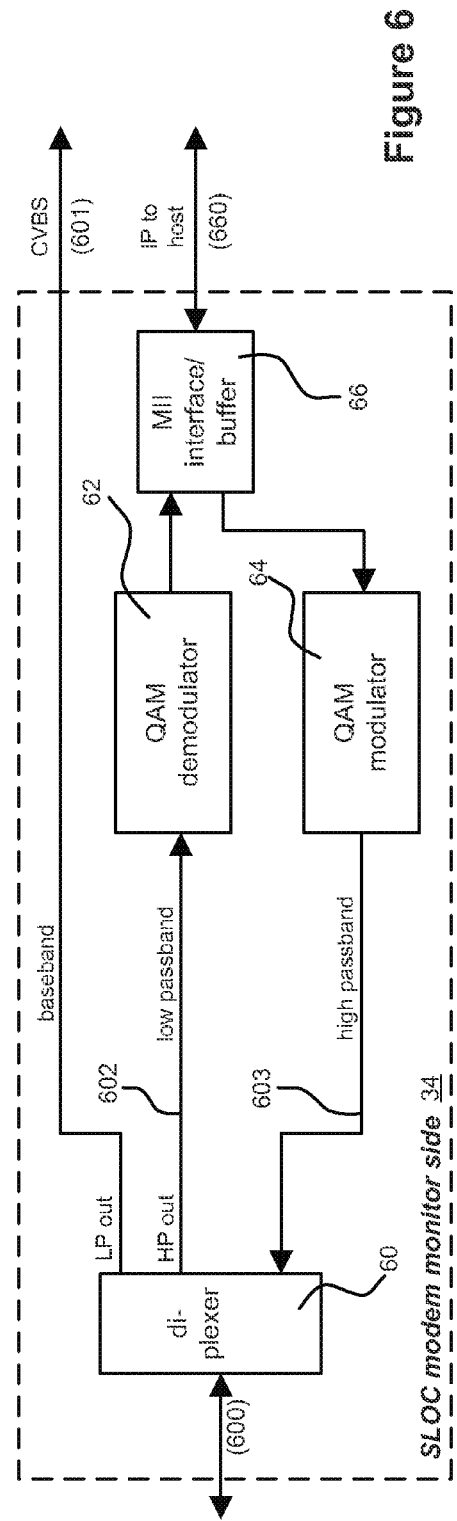
FIG. 6 is a block schematic of a security link over coax monitor side modem according to certain aspects of the invention.
Figure 8:
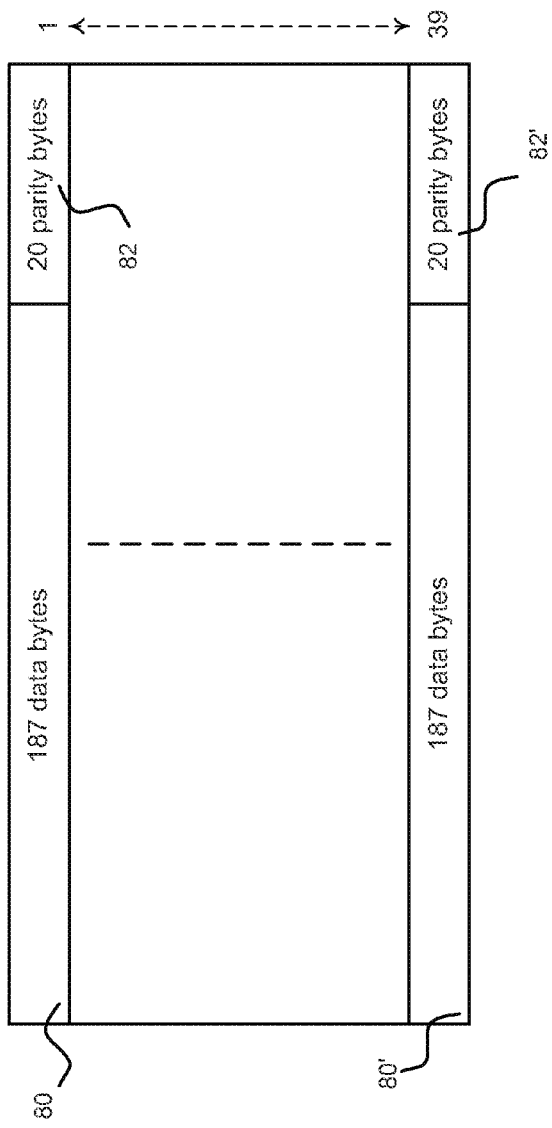
FIG. 8 illustrates a forward error correction ("FEC") data frame according to certain aspects of the invention.

FIG. 6 depicts certain aspects of the SLOC monitor side modem 34 shown in FIG. 3. SLOC modem 34 may comprise a diplexer 60 configured to receive and split the downstream combined baseband CVBS and low passband IP signals from coax 600, using low pass filter ("LPF") and high pass filter (HPF). The CVBS signal 601 can be provided directly to an SD monitor or display device 33. The low passband signal 602 can be fed to a QAM demodulator 62 that operates in a similar manner to the QAM demodulator 54 on the camera side and whose output feeds the MII interface module 66. The diplexer 60 may also receive a high passband signal 603 from the QAM modulator 64 and can pass this upstream signal to the coax 600. The QAM modulator 64 receives an input from the MII interface 66, and the MII interface 66 is connected to a host/DVR 37 that supports the IP protocol, General Concepts of Framing in Digital Communications Systems With reference to FIG. 8, the digital data streams described herein typically have a frame structure that organizes data into uniformly sized groups of bits or bytes. Certain embodiments employ block-based forward error correction ("FEC") that has frames organized around the error correction code word size. Where interleaving is used to combat impulse noise, the frame structure can be arranged with interleaver parameters in mind. Where the system uses data randomization to achieve a flat spectrum, the pseudo-random sequence utilized may be synchronized to the frame structure, restarting at the beginning of each frame.

Figure 7:
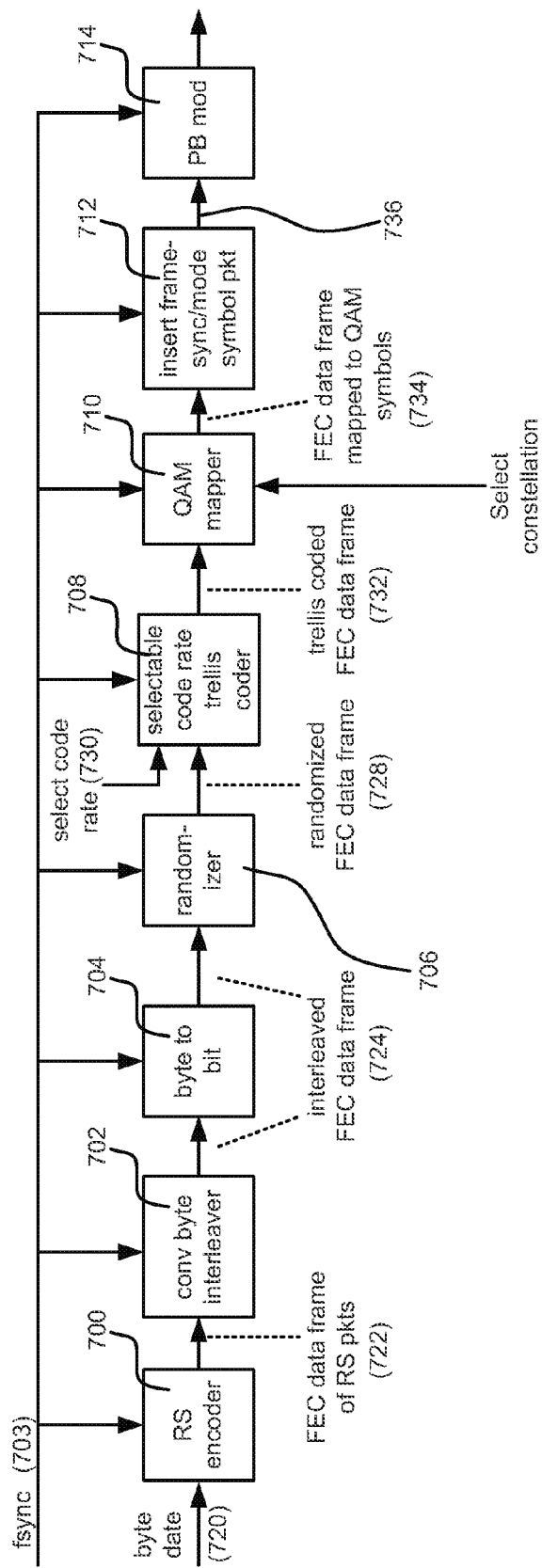
FIG. 7 is a block schematic of a QAM modulator according to certain aspects of the invention.

In certain embodiments, a frame may be divided into a plurality of segments, each segment comprising a number of symbols. Frames may be encoded using Reed-Solomon (RS) code-words that are formed by trellis encoding and mapping bits into a symbol set. In the example shown in FIG. 7, an RS encoder 700 accepts byte data and an externally generated frame sync signal 703 that indicates the start of each group of 315 Reed-Solomon packets. Each packet may comprise 207 bytes, of which 20 are parity bytes. These 315 Reed-Solomon packets form what an FEC data frame containing 65,205 bytes.

Figure 9:
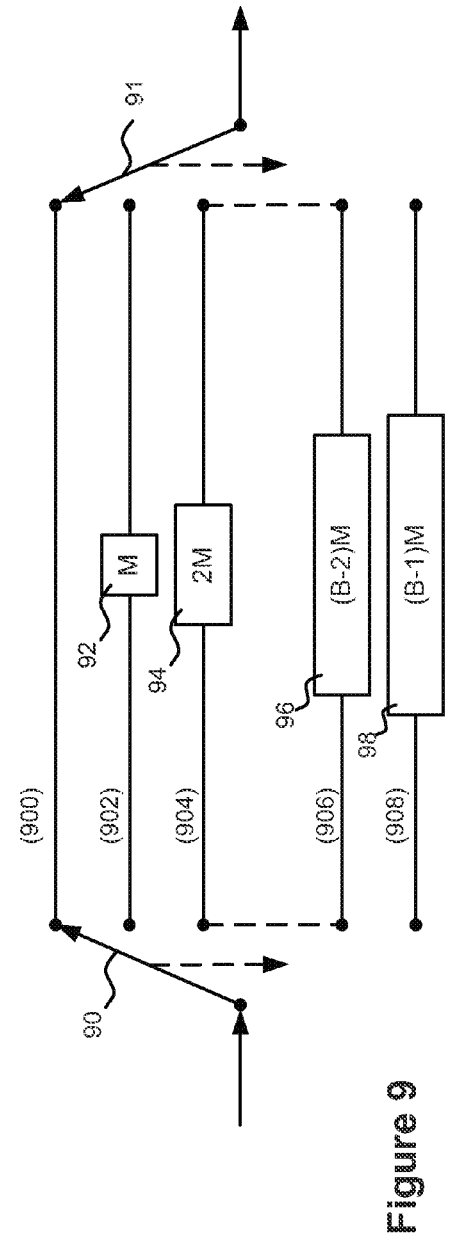
FIG. 9 illustrates operation of a convolutional byte interleaver according to certain aspects of the invention.

A convolutional byte interleaver 702 can be used to combat impulse noise that may affect the transmitted signal. One mode of operation of interleaver 702 is depicted in FIG. 9. In the example, parameter B in paths 96, 98 is set to 207, and parameter M in paths 92, 94, 96 and 98 is set to 1. Frame sync signal 703 forces input and output commutators 90 and 91 to top position 900, thereby synchronizing the interleaving to the frame structure. Input and output commutators 90 and 91 move down one position 902 as a byte enters the interleaver 702 and a different byte exits the interleaver 702. When commutators 90 and 91 reach the bottom 908, they shift back to the top 900. Each of the B parallel paths 906, 908 contains a shift register 96 and 98 having the lengths shown in the FIG. 9 (path 906 has length (B−2)M and path 908 has length (B−1)M), Note that, in FIG. 9, the length of top path 900 is zero.

Returning to FIG. 7, randomizer 706 produces a randomized FEC data frame 728 by operating on the 65,205×8=521,640 bits of the FEC data frame 724. Randomizer 706 may execute an exclusive-OR ("XOR") operation on the bits of the FEC data frame 724 with a pseudo-random noise ("PN") sequence of length 2$^{19}$−1, which is shortened by resetting the PN sequence generator at every frame sync time.

Figure 10:
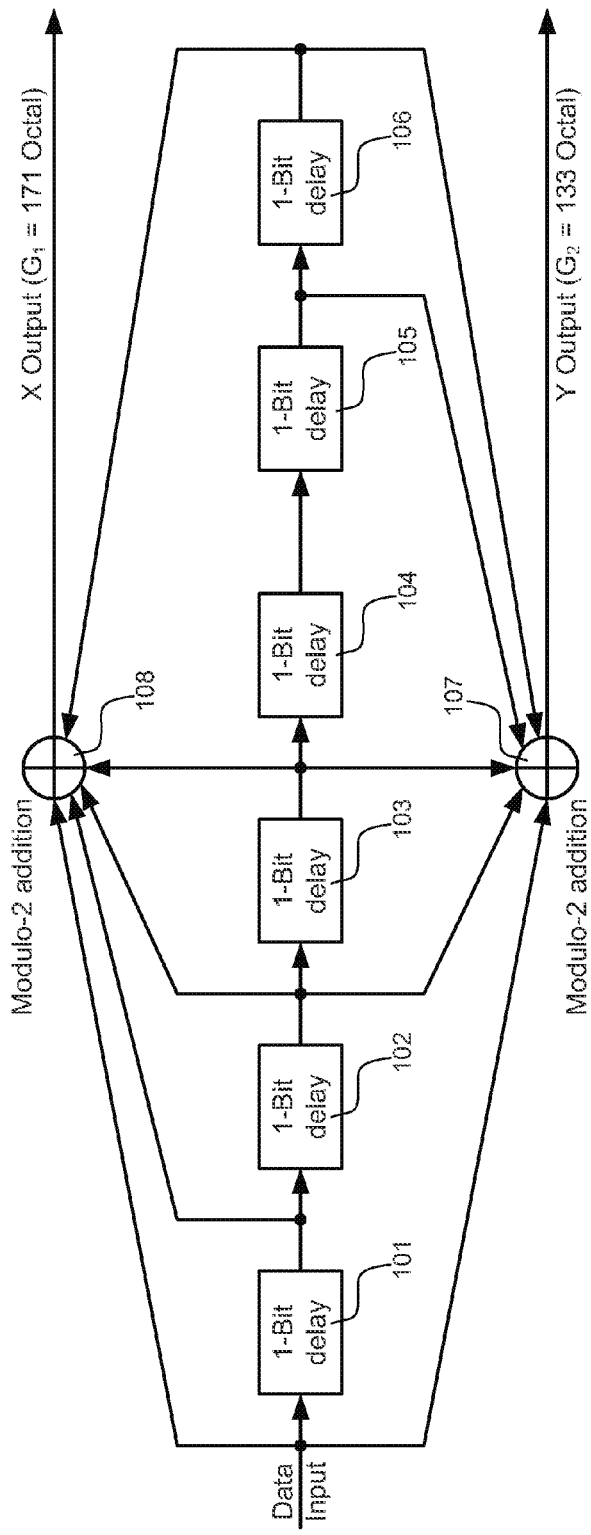
FIG. 10 illustrates operation of a selectable code rate punctured trellis coded modulation ("PTCM") module.

An example of a selectable code rate punctured trellis coded modulation ("PTCM") module 708 is shown in more detail in FIG. 10. PTCM 708 can use a method that starts with a 64 state ½ rate coder and executes puncturing to achieve any one of 5 different code rates 730. In certain embodiments, the PTCM 708 can also be completely bypassed (code rate=1). This allows for a selectable trade off between net bit rate and white noise performance of the system. Similar trellis coding techniques are used in ISDB-T and DVB-T systems. PTCM produces two bits at the output 732 for every bit provided to the input 728. However, some of the output bits are discarded according to the selected code rate and corresponding puncture pattern. QAM mapper 77 takes the bits in groups of 2, 4 or 6 from the coder output 732 and maps them into QPSK, 16 QAM, or 64 QAM symbols respectively. Examples of such mappings are illustrated in FIG. 11.

Module 712 adds a frame-sync/mode symbol packet (all symbols are QPSK) to the start of each FEC data frame 734. With reference also to FIG. 12, the first part 120 of this packet comprises 127 symbols and further comprises an identical binary PN sequence for both the real and imaginary parts of the symbols. Other PN sequence lengths are possible, and the real and imaginary parts can have opposite signs. The second part 122 of this packet comprises data that indicate the transmission mode—the selected QAM constellation and the selected trellis code rate. This mode data can be encoded using a block error correction code for added reliability at the receiver. Methods that can be employed include BCH coding and other block codes. In one example, 6 possible trellis code rates including bypass are possible. Additionally, three constellations are possible resulting in 18 modes. Accordingly, 5 bits are needed to represent each of the possible mode selections. The 5 bits could be encoded into a 16 bit code word using an extended BCH code. Since each QPSK symbol contains 2 bits, 8 mode symbols would be required.

FIG. 13 illustrates a frame structure 736 (see FIG. 7) provided to passband modulation ("PB Mod") 714. Payload 130 may comprise 315 RS packets (521,640 bits), The number of QAM symbols to which the 315 RS packets are mapped can vary with mode selection, PB Mod 714 modulates the baseband QAM symbols to passband using any suitable method known in the art.

Figure 11:
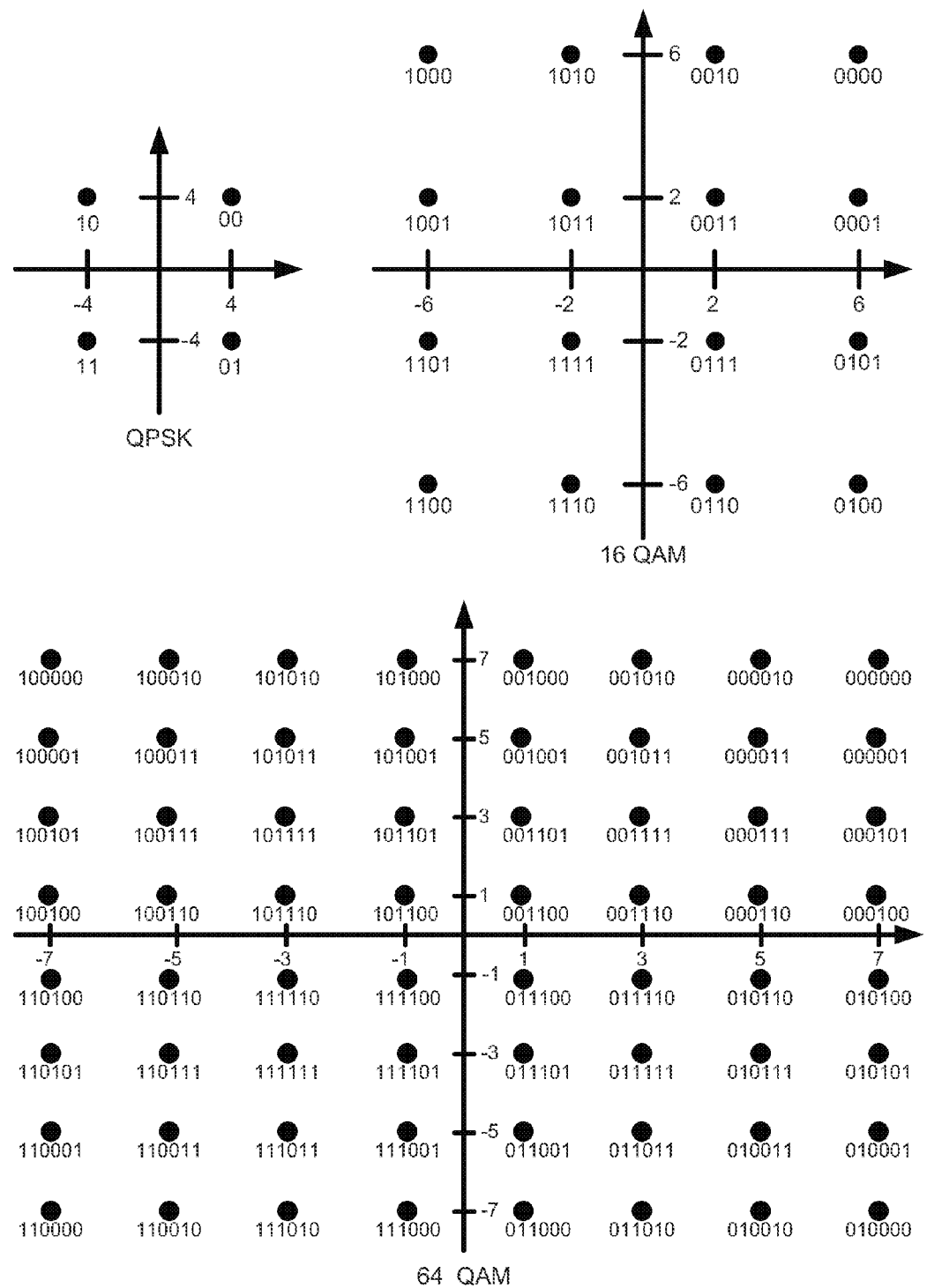
FIG. 11 shows examples of QAM mappings according to certain aspects of the invention.

The trellis coding illustrated in FIG. 11 adds bits, and the number of data bits per mapped QAM symbol (prior to trellis coding) is as shown in table 1.

TABLE 1

Data Bits per Symbol (input bits to trellis coder per mapped QAM symbol)

| | trellis code rates | | | | | |
|---|---|---|---|---|---|---|
| constellation | 1/2 | 2/3 | 3/4 | 5/6 | 7/8 | 1 |
| QPSK | 1.00 | 4/3 | 1.50 | 5/3 | 1.75 | 2.00 |
| 16 QAM | 2.00 | 8/3 | 3.00 | 13/3 | 3.50 | 4.00 |
| 64 QAM | 3.00 | 4.00 | 4.50 | 5.00 | 5.25 | 6.00 |

The number of QAM symbols to which the 315 RS packets (315×215×8=52,1640 bits) are mapped varies with mode selection. The fact that the number of data bits per symbol can be fractional requires that the RS packet size and the number of RS packets per frame be precisely selected. With RS packet size of 207 and 315 packets per frame an integral numbers of symbols per frame is attained. As shown in table 2, each entry can be calculated as:

$$\frac{\text{number of data bits per frame}}{\text{number of data bits per symbol}} = \frac{521640}{\text{entry from table 1}}:$$

TABLE 2

Symbols per Frame

| | trellis code rates | | | | | |
|---|---|---|---|---|---|---|
| constellation | 1/2 | 2/3 | 3/4 | 5/6 | 7/8 | 1 |
| QPSK | 521640 | 391230 | 347760 | 312984 | 298080 | 260820 |
| 16 QAM | 260820 | 195615 | 173880 | 156492 | 149040 | 130410 |
| 64 QAM | 173880 | 130410 | 115920 | 104328 | 99360 | 86940 |

PB Mod 714 modulates the baseband QAM symbols to passband as discussed herein.

Figure 14:
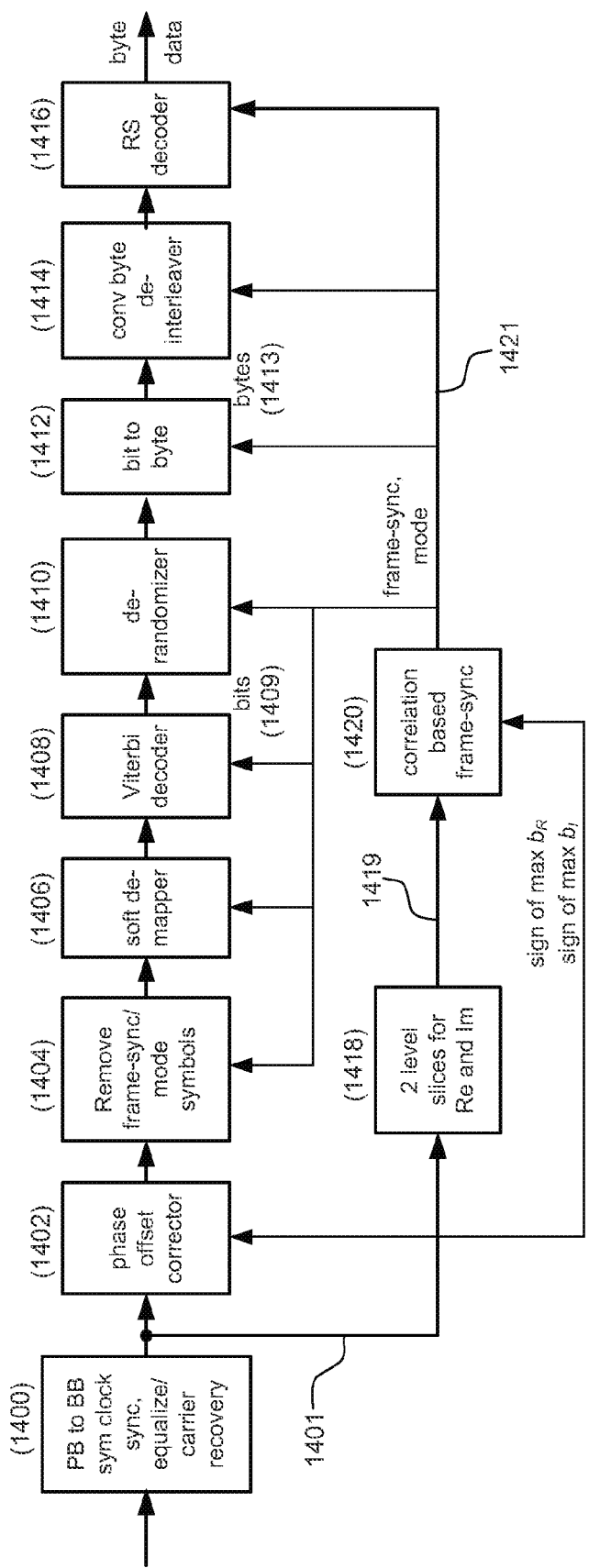
FIG. 14 is a block schematic of a QAM demodulator according to certain aspects of the invention.

With reference now to FIG. 14, certain aspects of QAM demodulators 54 and 62 shown in the modems of FIGS. 5 and 6 will be described in more detail. Module 1400 receives and converts transmitted data in a passband signal to baseband QAM symbols 1401. The operations performed by module 1400 typically include symbol clock synchronization, equalization (to remove inter-symbol interference) and carrier recovery, typically using sub-modules. Accordingly, module 1400 may comprise an equalizer that outputs recovered baseband QAM symbols 1401. Baseband QAM signals 1401 are provided to two-level slicer 1418 for slicing in both the real and imaginary directions, thereby forming the sequences $a_R[k]\epsilon[-1,+1]$ and $a_I[k]\epsilon[-1,+1]$ 1419 which are provided to frame-sync module 1420.

Frame sync module 1420 performs a continuous cross-correlation operation on the incoming sliced QAM symbols 1419, separately for both the real and imaginary parts, with a stored copy of the binary frame-sync PN sequence. Each member of the stored copy has a value of −1 or +1. This operation is given by Equation 1, reproduced here:

$$b_R[k] = \sum_{n=0}^{126} s[n]a_R[n-k] \text{ and } b_I[k] = \sum_{n=0}^{126} s[n]a_I[n-k] \quad \text{Eq. 1}$$

where s is the stored copy in the 127 long frame-sync PN sequence. The maximum magnitude of either $b_R$ or $b_I$ indicates the start of the FEC data frame. A frame sync pulse or other synchronizing signal is communicated to one or more of the receiver modules when this FEC data frame start point is detected in the stream.

Figure 15:
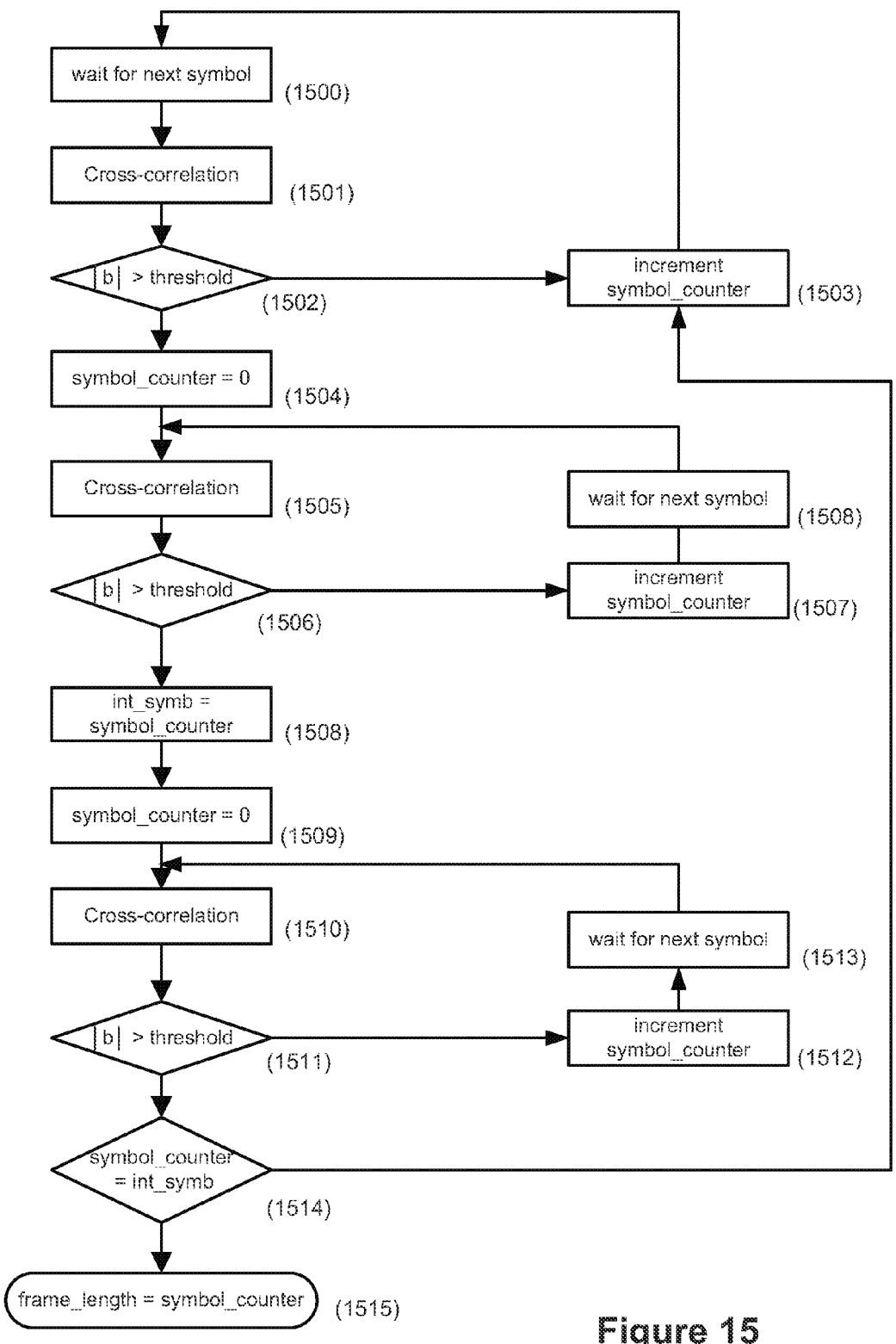
FIG. 15 comprises a flowchart of an algorithm usable to determine frame length according to certain aspects of the invention.

FIGS. 15 and 16 show elements of a process that can reliably produce a frame sync pulse when a noisy signal is received. Since the frame length will vary depending on the selected transmission mode (as shown in table 1), the algorithm determines the frame length (FIG. 15).

A process commencing at step 1500 is repeatedly executed as symbols are received, and a symbol counter keeps track of a number of symbols between executions that result in a value above a predetermined threshold. At step 1501, cross-correlation is performed for each arriving symbol and the symbol counter is incremented until the predetermined threshold is determined at step 1502 to have been exceeded. The symbol counter is incremented 1503 for each symbol until the threshold is exceeded. When the threshold is exceeded at step 1502, then the symbol counter is cleared 1504 and steps of cross-correlating 1505, incrementing symbol counter 1507 and receiving a new symbol 1508 are repeated until it is determined that the threshold has been exceeded at step 1506. An intermediate symbol count is recorded at step 1508 and the symbol counter is reset at step 1509. The steps of cross-correlating 1510, incrementing symbol counter 1512 and receiving a new symbol 1513 are repeated until it is determined that the threshold has been exceeded at step 1511. If at step 1514 the symbol counter is the same as the intermediate symbol count recorded at step 1508, then the frame length is returned at 1515 as the value of the symbol counter. It will be appreciated that, in the example described, frame length can be determined after two consecutive consistent counts. However, the number of required consecutive identical counts may be selected as desired.

FIG. 16 illustrates one process by which frame sync module 1420 produces correctly timed frame sync pulses even when the received signal is very noisy. The process also provides for acquisition of a new frame sync position when a temporary interruption of the signal occurs or after transmitter transmission mode changes cause corresponding changes in frame_size. A free running symbol counter counts the received symbols using modulo frame_size arithmetic, where frame_size has been determined by the steps described in connection with FIG. 16. It is anticipated that, when the result of the Eq. 1 cross-correlation exceeds the selected threshold value, the symbol counter value will always have the same value. When the value is consistent, a confidence counter is incremented up to a selected maximum—e.g. a maximum of 16; otherwise the confidence counter it is decremented toward a minimum of zero.

Thus, upon receipt of a symbol at 1650, cross correlation is performed at 1651 and, if the result at 1652 exceeds the threshold value, the current maximum is set to the threshold value and a maximum point is set to the current value of the symbol counter at 1653. In the example depicted, if the confidence counter at 1654 is set to at least a value of 4 and the current symbol count indicates the frame synchronization point (1655), then a frame sync signal is output at 1656. Next, the symbol counter is incremented at 1657, here using modulo 4 addition. The next symbol is awaited at step 1677 unless, at step 1670, the symbol counter is determined to be zero. If the symbol counter is zero, then the current maximum value is reset at 1671. Then, if the current maximum point is equal to the frame synchronization point at 1672, the confidence counter is incremented at 1673 and the next symbol is awaited at step 1677; otherwise, the confidence counter is decremented at 1674. In the presently illustrated example, if the confidence is determined to have fallen below 2 at step 1675, then the frame synchronization point is set to the current maximum point at step 1676. In either case, the next symbol is awaited at step 1677.

Eq. 1 is repeatedly executed as each symbol is received, and a symbol counter keeps track of the number of symbols between executions of Eq. 1 that result in a value above a predetermined threshold. When this resulting symbol count between a second and third above threshold result for Eq. 1 has the same count value as that which occurred between a first and second above threshold result for Eq. 1, then the receiver has reliably determined the number of symbols per frame, which is indicated by this count value. A variable frame_size is set to this count value. The algorithm can easily be extended to require more than two consecutive above threshold results for Eq. 1 with the same symbol count.

As illustrated in FIG. 16, the frame sync module is caused to produce frame sync pulses at the right time even if the received signal is very noisy, and also provides for the acquisition of a new frame sync position in case there has been some temporary interruption of the signal or if the transmitter changes transmission modes and thus changes frame_size. A free running symbol_counter counts the received symbols modulo frame_size (frame_size having been determined as shown in FIG. 15). It is expected that the symbol counter value where the Eq. 1 result is above threshold will always be the same count value (i.e. once per frame). When this occurs, a confidence_counter is incremented (to a maximum of, for example, 16), otherwise it is decremented (minimum zero). When the confidence_counter exceeds a predetermined value, say 4, it can be said that frame sync has been reliably acquired and then the frame sync module is cleared to output frame sync pulses at the correct time. As long as the confidence counter is greater than 4, the frame sync pulse will be output at the correct time (start of frame), even if noise occasionally causes Eq. 1 to produce a low value.

If the transmission mode changes, the confidence counter will ultimately count back to zero. This can be used to trigger a return to the portion of the process shown in FIG. 16 that is used to determine the new frame_size.

Figure 17:
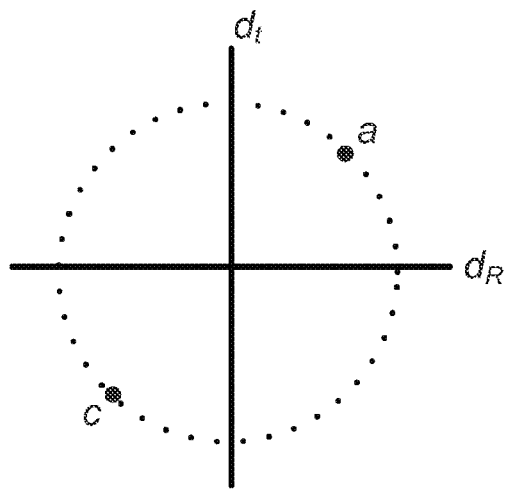
FIG. 17 illustrates a transmitted constellation according to certain aspects of the invention.

Certain embodiments assert signal disruption signal 265 based on the state of the demodulator frame sync confidence_counter. As discussed herein with reference to FIG. 17, a frame sync process can continue to free run even if no symbols are being received. Furthermore, a loss of synchronization typically occurs when the cable is disconnected or when the signal is disrupted and, under such loss of synchronization, confidence_counter quickly counts down to zero. Signal 265 can be used to indicate various conditions include cable disconnected and signal disruption conditions. For example, a cable disconnected condition can be asserted on signal 265 when the confidence_counter remains at zero and the disconnect or disruption condition is sustained for at least a time $t_d$, while a signal disruption condition can be asserted on signal 265 when continued variations in confidence_counter are detected or a sustained reduction in the value of confidence_counter occurs.

Figure 18:
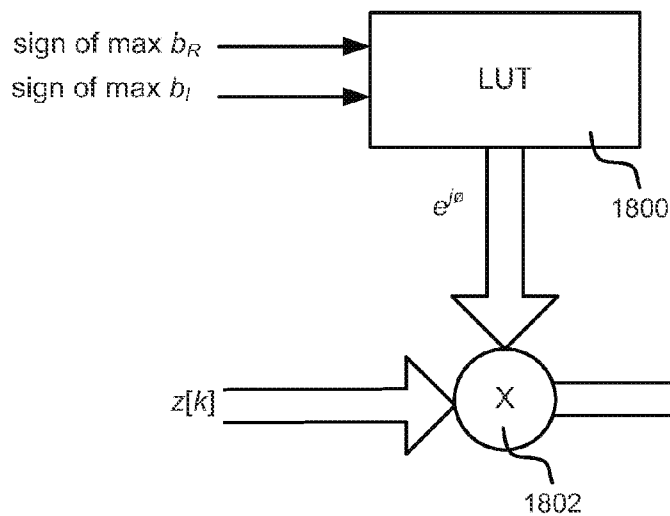
FIG. 18 illustrates operation of a phase offset corrector module according to certain aspects of the invention.

As explained herein, in relation to carrier recovery, there is a π/2 ambiguity in the recovered carrier phase. This results in an arbitrary additional recovered phase offset of zero, ±π/2, or π. For the frame sync symbols, the real and imaginary parts are the same sign, so for them the transmitted constellation is as shown in FIG. 18.

From this it can be understood that for zero phase offset, the signs of the maximum magnitude $b_R$ and $b_I$ are both positive. A −π/2 offset will yield a negative maximum magnitude $b_R$ and a positive maximum magnitude $b_I$. For an offset of π, both will be negative, and for an offset of π/2, the maximum magnitude $b_R$ will be positive and the maximum magnitude $b_I$ will be negative. This is summarized in Table 3.

TABLE 3

| Sign of max $b_R$ | Sign of max $b_I$ | Phase correction needed |
|---|---|---|
| + | + | 0 |
| − | + | +π/2 |
| − | − | +π |
| + | − | −π/2 |

Figure 19:
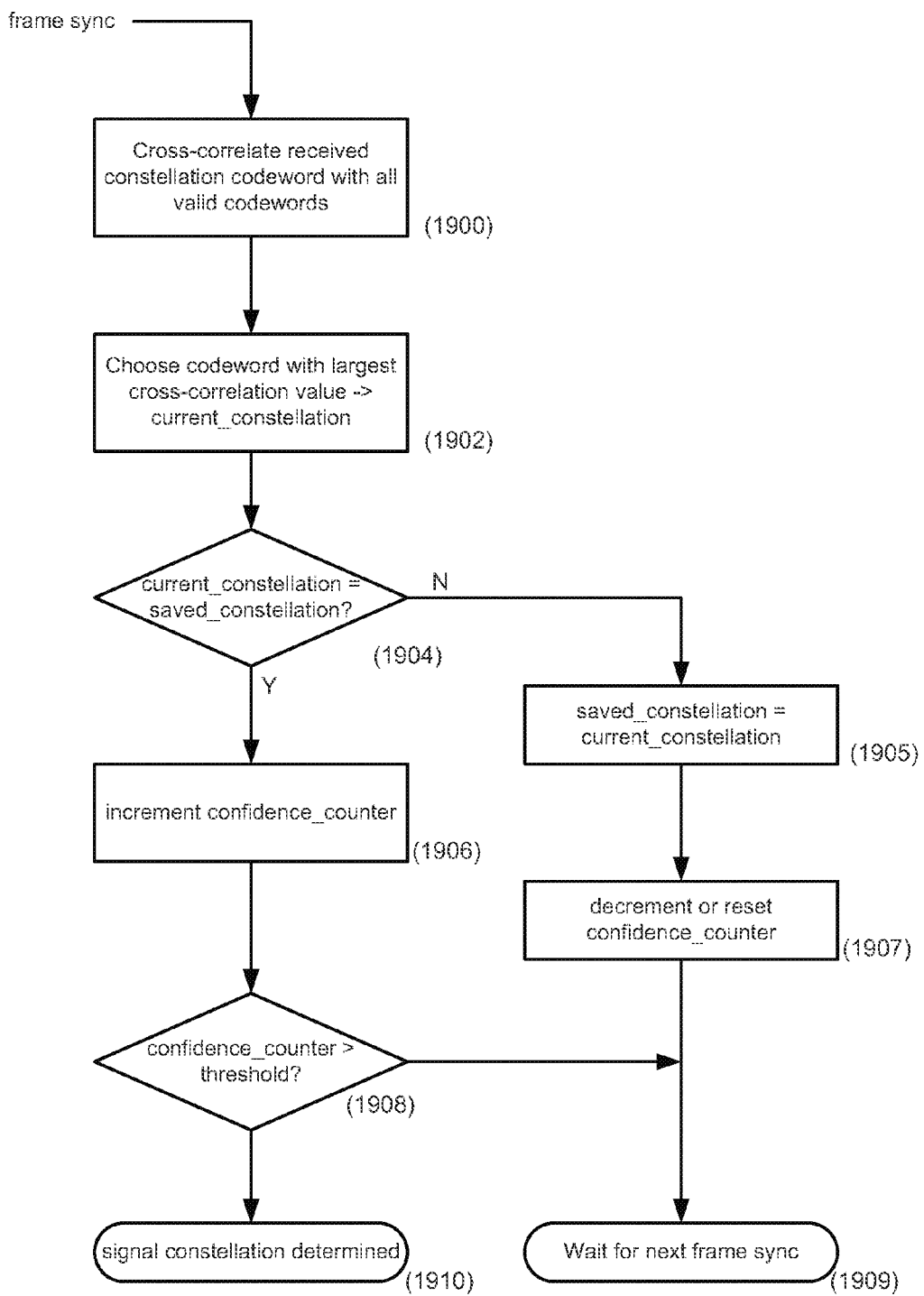
FIG. 19 comprises a flowchart of an algorithm used in a frame-sync module according to certain aspects of the invention.

Thus, the respective signs of the maximum magnitude $b_R$ and $b_I$ in combination indicate to which quadrant of the complex plane the final phase offset has converged. This allows for an additional phase correction to be applied to the signal as shown in FIG. 14. The signs of the maximum $b_R$ and $b_I$ are sent from the correlation based frame-sync module to the phase offset corrector. The operation of one phase offset corrector module is shown in FIG. 18, for which a LUT table 1804 is shown in the example. Given that $z[k]=z_R[k]+jz_I[k]$, this operation can be executed simply as:

1. for the case of φ=+θ: $z'[k]=-z_R[k]-jz_I[k]$
2. for the case of φ=+π/2: $z'[k]=-z_I[k]-jz_R[k]$
3. for the case of φ=−π/2: $z'[k]=-z_I[k]-jz_R[k]$ Once the frame sync start position is located and the mπ/2 phase offset corrected, the position of the code words containing the mode bits (constellation and trellis code rate) is known. The code words can then be reliably decoded by, for example, a BCH decoder or by correlating the received code word with all the possible code words and choosing the one with the highest resulting value. Since this information is sent repeatedly, additional reliability can be obtained by requiring that the same result occur multiple times before it is accepted. FIG. 19 shows a simple algorithm for this, operating within the frame-sync module 1420 of FIG. 14. In certain embodiments, a cable disconnect/signal disruption alert may be asserted when reliability of the detected constellation falls below a threshold value, wherein the measurement of reliability is based on sequential detections of a constellation that is one of a plurality of possible constellations.

A frame-sync signal output from the frame-sync module is used to indicate which symbols are to be removed in the "remove frame-sync/mode symbols" module before symbols are fed to the soft de-mapper. In this example, the 127 frame-sync symbols and the 8 mode symbols are removed from the stream. This ensures that only symbols corresponding to the RS packets are passed to the soft de-mapper.

The soft de-mapper calculates soft bit metrics using well known algorithms. For correct operation, the soft de-mapper must typically know which puncture pattern (which trellis code rate) was used in the transmitter and also the alignment of that pattern with the received bits. This is provided by the frame-sync module which has decoded the mode information and also provides a repeating frame sync signal to which the puncture pattern is aligned, regardless of the current mode. These soft bit metrics can be fed to the Viterbi decoder that operates according to methods known to those skilled in the arts to arrive at estimates of the bits that were input to the PTCM encoder in the transmitter. Then the de-randomizer, byte de-interleaver, and RS decoder, all synchronized by the frame-sync signal, de-randomize, de-interleave, and decode the byte data that originally entered the RS encoder in the transmitter.

Baseband to Passband Modulation

Nearly all wireless digital communication systems, including broadcast, wireless LAN, and wide area mobile systems, employ QAM (quadrature amplitude modulation) in some form. QAM is also utilized in both the North American and European digital cable television standards. This method uses quadrature-carrier multiplexing such that two double-sideband suppressed-carrier modulated waves can occupy the same channel bandwidth, with each wave modulated by an independent message. A simple QAM modulator (PB mod 714 of FIG. 7) is shown in FIG. 20.

Figure 20:
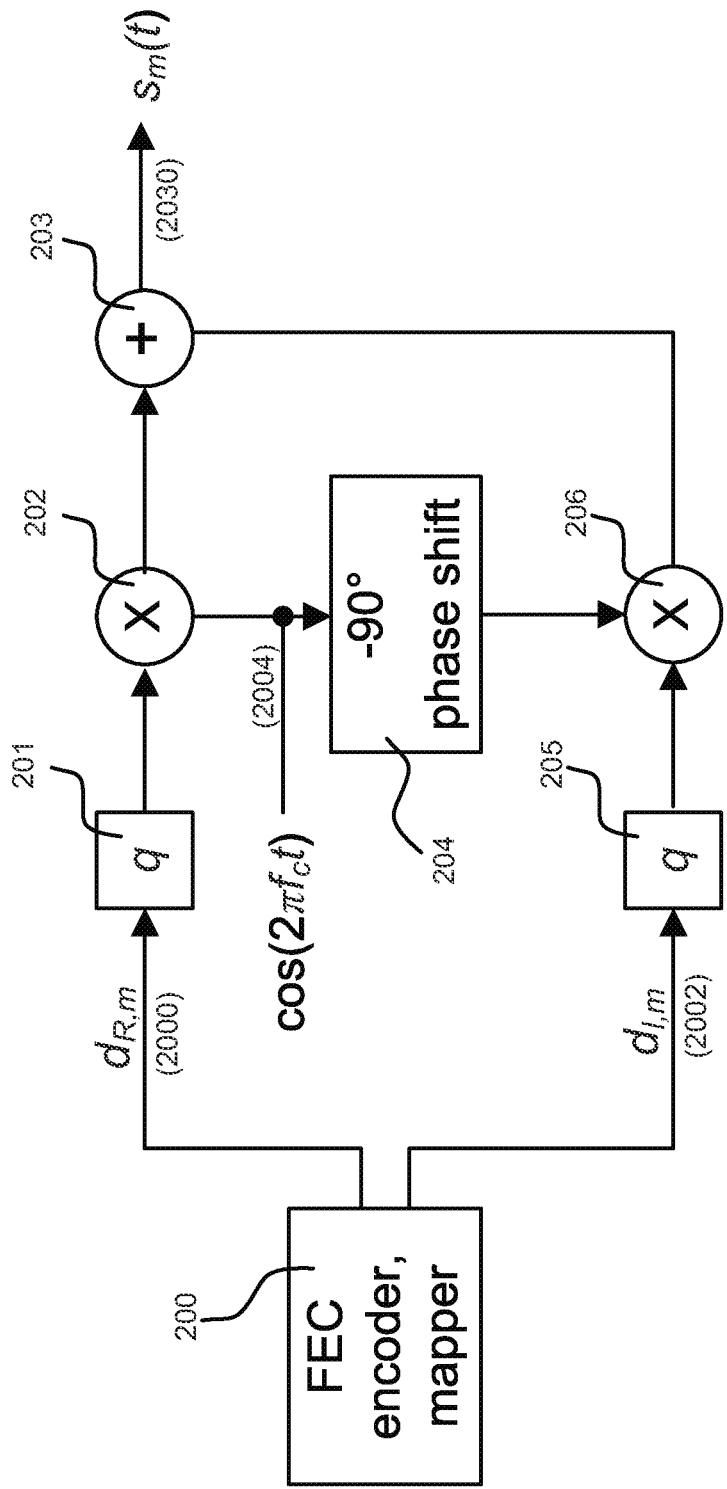
FIG. 20 illustrates operation of a simple QAM modulator according to certain aspects of the invention.

FIG. 20 is a simplified schematic of a camera-side baseband to passband QAM modulator according to certain aspects of the invention. Data from MII 50 (FIG. 5) is received by FEC encoder/mapper 500 which adds error protection data to the data stream received from MII 50 using, for example, concatenated Reed-Solomon coding, byte interleaving and/or trellis coding. Mapper/encoder 200 demultiplexer the data into streams 2000 and 2002, with a given size group of bits for each stream representing a QAM symbol amplitude level respectively in the real and imaginary directions. An isolated transmitted QAM pulse is given by:

$$s_m(t)=d_{R,m}q(t)\cos(2\pi f_c t)-d_{I,m}q(t)\sin(2\pi f_c t)=Re\{d_m q(t)e^{j2\pi f_c t}\},$$

where $d_{R,m}$ and $d_{I,m}$ are determined by two independent message streams and represent the real and imaginary parts respectively of a complex QAM symbol, with m=1 . . . M indexing a 2-dimensional QAM constellation of cardinality where M is the modulating carrier frequency, and q(t) is a root raised cosine pulse function.

A continuous series of transmitted QAM pulses s(t) passes through a noisy multipath channel at a rate of $F_S=1/T_S$. Thus, the received signal at the input to the QAM receiver is given by r(t)=s(t)*c(t)+v(t) where * denotes convolution, c(t) is the channel impulse response, and v(t) is additive white Gaussian noise. Thus:

$$r(t) = Re\left\{e^{j2\pi(f_{LO}+f_o)t+\theta_o} \sum_{n=-\infty}^{+\infty} [d[n]*q(t)]c(t-nT_s)\right\} + v(t),$$

where d[n] is the complex transmitted symbol, and $f_0$ and $\theta_0$ are the frequency and phase offsets respectively of the receiver passband to baseband demodulator local oscillator with respect to the transmitter, such that $f_{LO}=f_c-f_0$.

Passband to Baseband Demodulator

Figure 21:
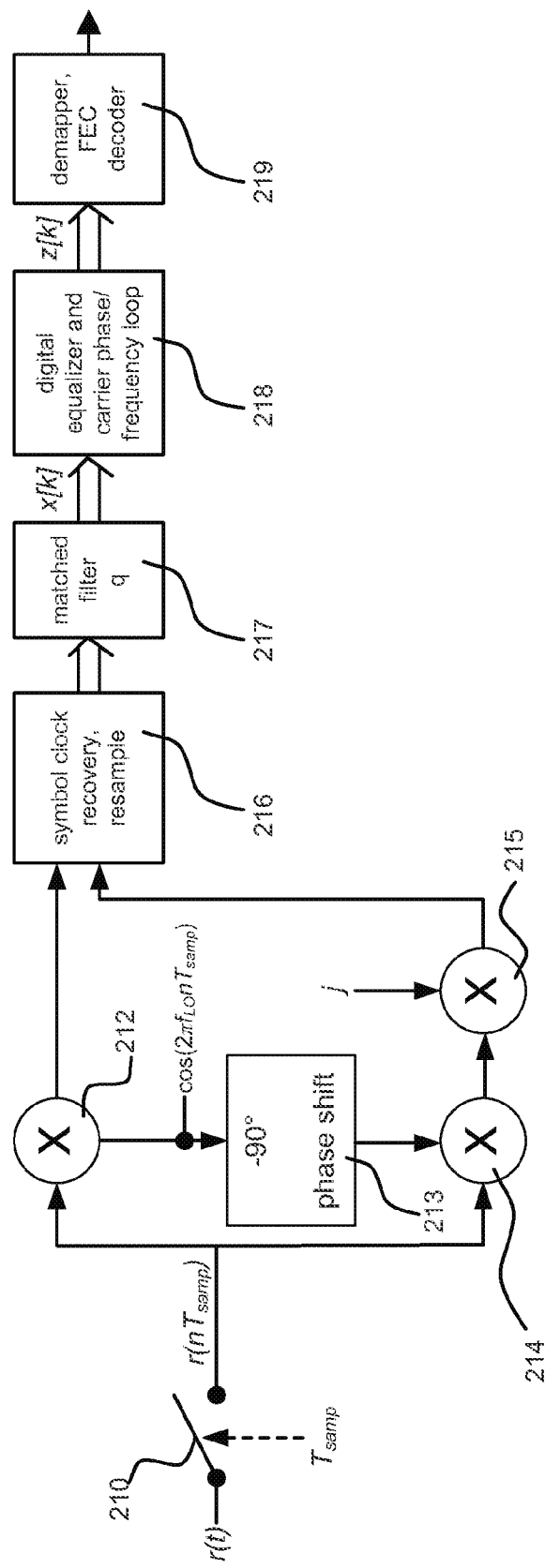
FIG. 21 illustrates passband to baseband, symbol clock sync, equalizer/carrier recovery according to certain aspects of the invention.

FIG. 21 shows an example of a monitor side passband to baseband QAM demodulator in some detail. A signal r(t) may be received from a coax cable, for example. Signal r(t) is sampled (see 210) at a rate higher than the symbol rate, resulting in the sampled signal $r(nT_{samp})$. After sampling:

$$r(nT_{samp}) = \text{Re}\left\{ e^{j2\pi(f_{LO}+f_o)nT_{samp}+\theta_o} \sum_{m=-\infty}^{+\infty} [d[m] * q(nT_{samp})]c(nT_{samp} - mT_s) \right\} + v(nT_{samp}).$$

Then, after downconversion, resampling at the symbol rate $1/T_S$ and matched filtering obtains:

$$x(kT_s) = x[k] = e^{j2\pi f_o kT_s + \theta_o} \sum_{m=-\infty}^{+\infty} d[m]c[k-m] + v'[k],$$

where v'[k] is sampled complex filtered noise, assuming that any ISI is due only to the channel impulse response c because of the pulse shaping and matched filtering q, combined with perfect symbol rate sample timing.

Equalizer and Carrier Phase/Frequency Loop

The digital equalizer and carrier phase/frequency loop 218 of FIG. 21 is discussed in more detail with reference to FIG. 22. A signal x[k] enters an adaptive digital equalizer 220, which can include a linear digital filter used to remove and/or compensate for ISI caused by the channel impulse response c. The error calculator module 222 calculates an error signal e[k], which can be used to calculate an updated set of filter tap weights using, for example, a filter based on a least mean squares ("LMS") algorithm. Such filters can remove the ISI caused by the channel impulse response c. The equalizer output y[k] is then phase rotated in order to reduce any remaining carrier phase and frequency offset. The phase rotated output z[k] is then processed by the slicer and phase error detector module 227 which calculates a phase error value $e_\theta[k]$ that feeds an integral-proportional filter 226. The integral-proportional filter 226 output feeds the integrator and complex exponential look up table 224 which calculates complex exponential values used in the loop to correct the carrier phase and frequency offset. The slicer and phase error detector module 227 also outputs a nearest neighbor 2-dimensional sliced symbol decision whose phase is "un-corrected" by multiplication with $e^{-j\theta[k]}$ then used in the error calculator module 222. The error calculator module 222 utilizes that input as well as y[k] to calculate and error signal e[k]. Note that the internal operations of the error calculator module 222 and the slicer and phase error detector module 227 depend on the current stage of operation (1, 2 or 3) as determined by the stage controller 223.

Tap weight adjustment can be achieved using any suitable method, including the LMS algorithm. The equalizer compares its output y[k] with a phase rotated version of 2-dimensional ("2-D") slicer decision $\hat{d}[k]$ to create an error signal which is used to calculate an updated set of filter tap weights. The LMS algorithm may operate as follows:

let: x[k] represent an L long equalizer input vector, and
y[k] represent the equalizer output vector $g^H[k]x[k]$,
where $g^H[k]$ is the L long equalizer tap weight vector and the H superscript indicates conjugate transposition (Hermitian). Calculate updated e[k] in the error calculator module using methods discussed herein:

$$g[k+1]=g[k]-2\mu x[k]e^*[k], \quad \text{Eq. 2}$$

where μ is a small step size parameter, and the * superscript indicates complex conjugation.

The stage controller takes the equalizer and carrier phase/frequency loop through three stages of operation. The switching from stage 1 to stage 2 to stage 3 can be performed based on simple count thresholds of input data samples x[k]. Note that more complicated stage switching based on estimates of error at the equalizer output are also possible and are well known (discussed later). The three stages are summarized in Table 4. The meaning of the table entries will become clear through the descriptions of the system herein.

TABLE 4

Equalizer and Carrier Phase/Frequency Loop Stages

| Stage | $e_\theta[k]$ calc. method | e[k] calc. method | State of freq./ phase recovery |
|---|---|---|---|
| 1 | CMA | Always zero | Constellation spinning |
| 2 | CMA | Based on reduced constellation (RCCR) | Phase/freq. gradually recovered |
| 3 | DD | Based on full constellation | Phase noise reduced |

Figure 23:
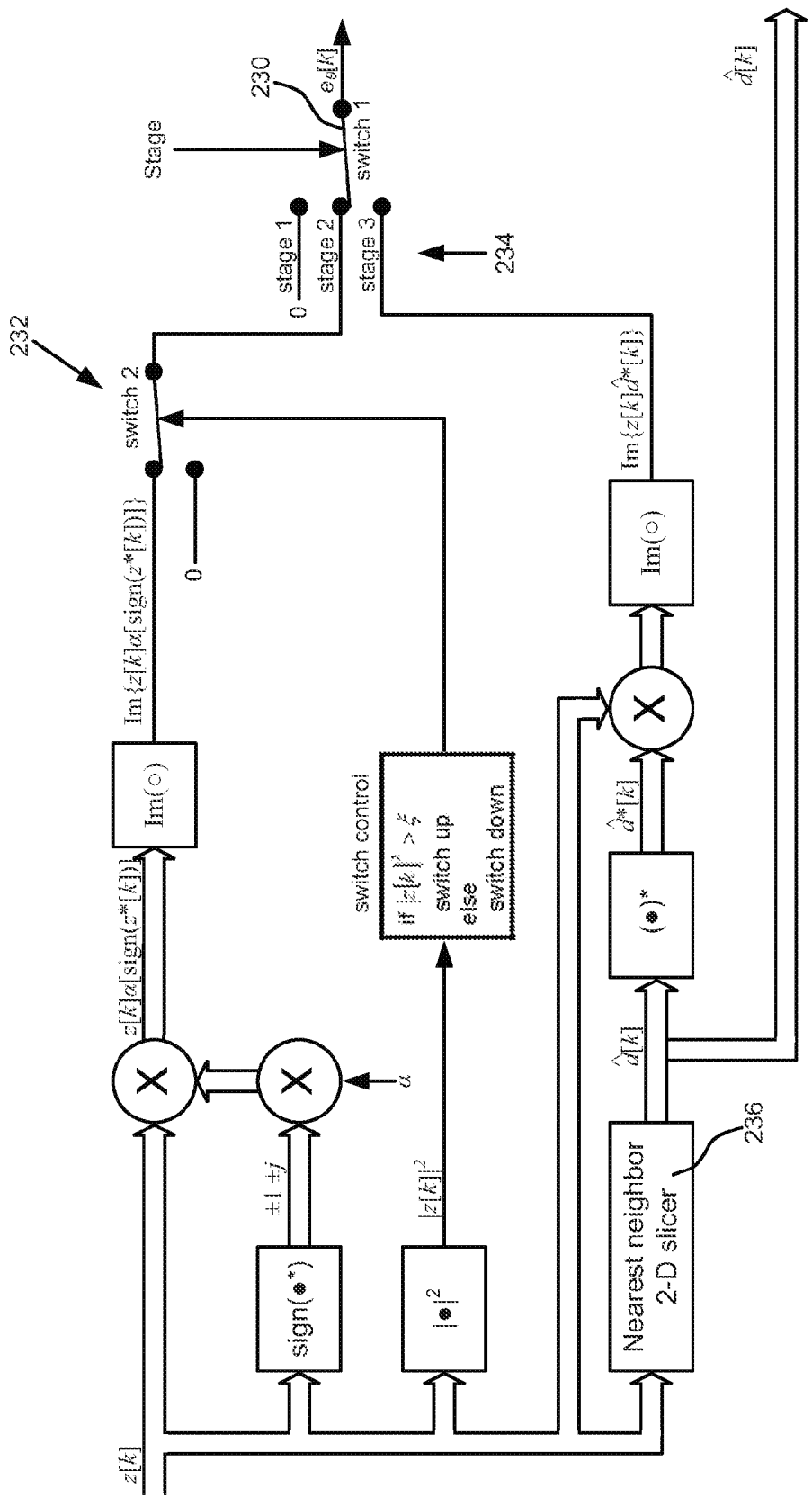
FIG. 23 depicts and example of an equalizer and carrier phase/frequency module.

A slicer and phase error detector module 227 is shown in more detail in FIG. 23. Switch 230 is set according to one of three stages 234 of operation. During stage 1, switch 230 is in the topmost position so that $e_\theta[k]=0$. This effectively turns off the carrier loop so that there is no carrier phase correction during this stage. During stage 2, switch 230 is in the middle position and the loop operates using a reduced constellation carrier recovery (RCCR) algorithm. If the power of the symbol z[k] given by $|z[k]|^2$ exceeds a threshold ξ, then it is presumed that z[k] is one of the corner symbols of the constellation and RCCR is enabled by setting depicted second switch 232 to upper position, yielding $e_\theta[k]=\text{Im}\{z[k]\alpha[\text{sign}(z^*[k])]\}$. Otherwise, if $|z[k]|^2 \leq \xi$, second switch 232 is in the lower depicted position disabling the carrier loop. Thus only a subset of the symbols can contribute to carrier recovery during stage 2. The threshold ξ can be reduced to include more symbols in the regions near the constellation corners, but the resultant phase correction term $e_\theta[k]$ will be noisier. During stage 3, switch 230 is in the lowest depicted position, yielding $e_\theta[k]=\text{Im}\{z[k]\hat{d}^*[k]\}$, where $\hat{d}^*[k]$ is the complex conjugate of the nearest neighbor 2-dimensional sliced symbol decision $\hat{d}[k]$. During stage 3, it is presumed that enough time has passed so that the equalizer taps have converged and the carrier phase has been substantially corrected such that the sliced symbol decisions are reliable. Notably, the relations $e_\theta[k]=\text{Im}\{z[k]\alpha[\text{sign}(z^*[k])]\}$ and $e_\theta[k]=\text{Im}\{z[k]\hat{d}^*[k]\}$ effectively operate within a single quadrant of the complex plane. This results in an mπ/2 ambiguity in recovered carrier phase as discussed above.

Figure 24:
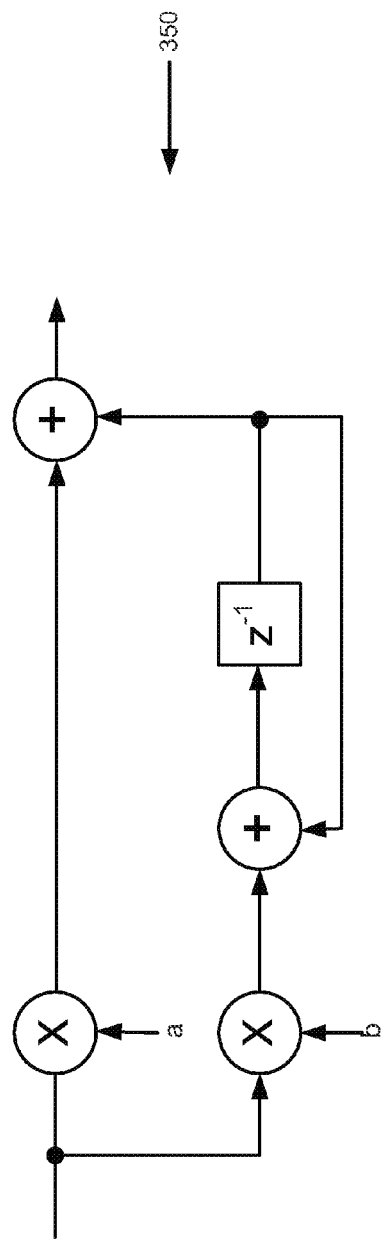
FIG. 24 shows an example of an integral-proportional filter according to certain aspects of the invention.
Figure 25:
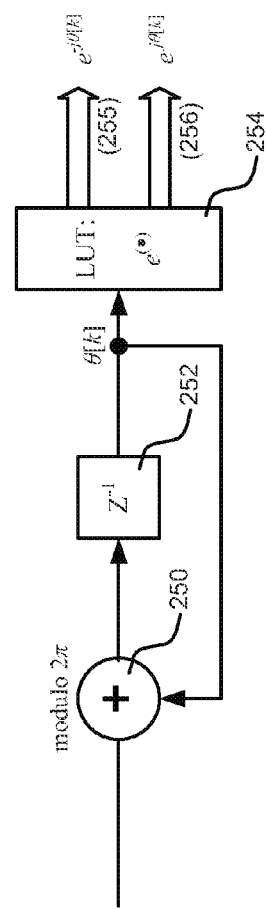
FIG. 25 shows an example of use of an integrator and complex exponential lookup table according to certain aspects of the invention.

An example of an integral-proportional filter 226 (see FIG. 22) is shown in more detail in FIG. 24. Integral-proportional filter 226 allows the loop to correct both phase and frequency offsets. The output of the integral-proportional filter 226 feeds the integrator and complex exponential LUT module 254, shown in more detail in FIG. 25. The input of integrator/LUT 224 is modulo 2π added 250 to a one step delayed 252 version of the input to form a phase error signal θ[k] which is fed to a lookup table (LUT) 254 that outputs phase correction factor 255 ($e^{-j\theta[k]}$) that corrects for both $\theta_o$ and $f_o$. LUT 254 also provides an output 256 ($e^{+j\theta[k]}$) that "un-corrects" the slicer output $\hat{d}[k]$ so that it can be used to derive an error signal for the equalizer tap update. This is needed because the equalizer operates on x[k] which contains both $\theta_o$ and $f_o$.

Figure 22:
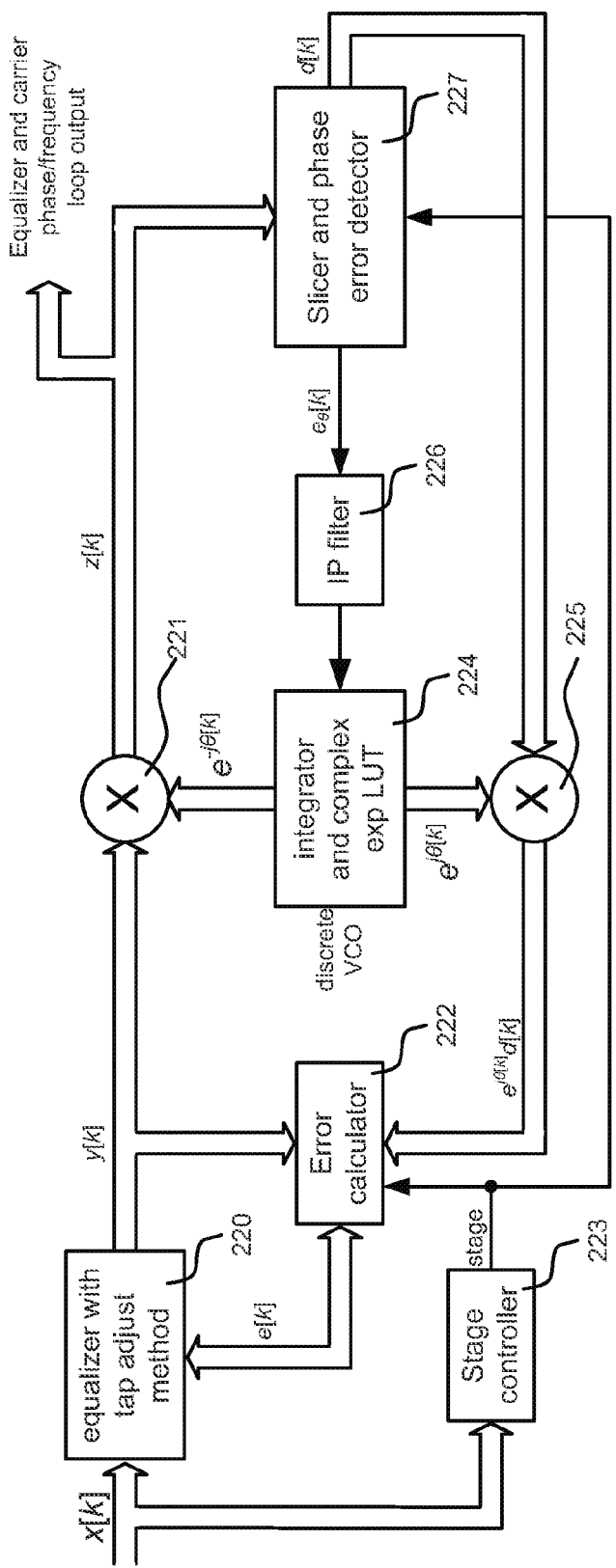
FIG. 22 illustrates an equalizer and carrier phase/frequency loop including wide signal paths that are complex values.

Certain embodiments can assert signal 265 to indicate that a signal disruption has been detected based on signals generated by the equalizer and carrier phase/frequency loop, as described in relation to FIGS. 22 and 23 and characterized by Eq. 4. When a signal is first received during system start-up, the stage controller illustrated in FIG. 23 of the QAM demodulator commences at stage 1 and progresses through multiple stages 234. As the equalizer and carrier phase/frequency recovery loop converge, the stage controller passes through stage 2, finally resting at stage 3. After the digital equalizes has converged and is operating at stage 3, any subsequent disruption or disconnection of the cable can cause degradation and/or loss of signal, an increase in the MSE calculated by Eq, 4, and a switch back to stage 1. This transition and/or the control signal for switch 230 can be used to assert signal 265. In certain embodiments, signal 265 is asserted if nonconvergence is sustained for at least a time $t_d$.

Certain embodiments can detect cable tap insertions and attempts to physically probe the center conductor of a coaxial cable 31 (FIG. 3) in order to connect an unauthorized monitor, for example, without disconnecting modems 33 and 34 and thus disconnecting camera 30 from monitor-side equipment 33, 35 and/or 37. When such tap is attempted, cable characteristics are typically affected. For example, it can be expected that the frequency response associated with coax 31 will change when a tap is attempted or established. An attempted tap may be detected as a change in the number and time spacing of signal reflections. Also the impedance seen by the transmitter may change. Monitoring of reflections and impedance can be useful in determining that an attempt to tamper with coax cable 31 has occurred. Accordingly, certain embodiments determine that tampering has occurred when adjustments to the selected filter taps are required match changing characteristics of the coaxial cable, and an alarm signal may be generated when one or more of the characteristics of the coaxial cable are changed by a predetermined amount.

In certain embodiments, a tap or intercept can be detected by monitoring changes in AGC gain control as described herein. Referring again to the AGC loop in FIG. 27, a change in either the magnitude output block 271 level or the gain control signal 277 that exceeds a pre-determined threshold can indicate physical tampering with the cable and can be used to trigger a tamper alarm. Triggering of the alarm may occur where changes persist for at least a predetermined duration $t_d$.

In certain embodiments, a tap or intercept can be detected using the digital equalizer 1400 (FIG. 14) that is shown in more detail in FIG. 22. For example, the equalizer with tap adjust method described herein typically converges to a set of tap weight values that compensate for cable frequency tilt and signal reflections. The LMS equalizer tap weight adjustment algorithm described herein can easily track slow changes in cable characteristics due to normal aging. During any relatively short period of time tap weights would not be expected to change very much. Physical tampering with the cable can result in the equalizer rapidly changing its tap weights to compensate for the sudden change in cable characteristics. Therefore, if the tap weights change to a degree that exceeds a predetermined threshold, and this change occurs in a relatively short period of time ($<t_1$), and the condition persists for at least $t_d$, this can indicate physical tampering with the cable and can be used to trigger a tamper alarm. In one example, tap weight changes may be monitored for changes in any single tap weight that exceeds a predetermined threshold. The predetermined threshold may be determined as a tolerance specified or calculated for the coax cable used in a particular application, and may be adjusted based on a record of tap weight settings for one or more embodiments using the type of cable. In another example, physical tampering may be indicated when a change in the 2-norm of the set of tap weights exceeds a pre-determined threshold, where the 2-norm is defined as $\|g\|_2 = \sqrt{g^H g}$ where g is the tap weight vector.

Error Calculator Module and Stage Operation Summary

Error calculator 222 (FIG. 22) can employ different methods for calculating e[k] depending on the stage. For stages 1 and 2, e[k] is typically calculated using a process based on a constant modulus algorithm (CMA):

$$e[k] = y[k](|y[k]|^2 - R),$$

where R is a pre-determined constant given by:

$$R = \frac{E\{|d[k]|^4\}}{E\{|d[k]|^2\}}, \tag{Eq. 3}$$

and where E is the expectation operator and d[k] is a symbol. Note that this e[k], which drives the tap update of Eq. 2 above, is independent of symbol decisions and the phase of x[k] and depends only on the equalizer output, the equalizer input, and the statistics of the constellation. It can be shown that during stages 1 and 2, the use of the CMA error to drive Eq. 2 is equivalent to minimizing the ISI, even though the constellation is spinning due to the carrier frequency and phase offsets.

During stage 1, the phase/frequency recovery loop is disabled, and the equalizer minimizes the ISI using the CMA error function. After the ISI has been minimized, stage 2 begins and the loop is turned on for RCCR; carrier phase/frequency recovery begins using only the corner symbols of the constellation, as previously explained elsewhere herein. At the end of stage 2, carrier phase and frequency have been recovered sufficiently so that the 2-dimensional slicer 236 of FIG. 23 begins to output reliable symbol decisions $\hat{d}[k]$.

Decision directed (DD) error may be used in stage 3. The DD error may be calculated as $e[k] = e^{j\Theta[k]}\hat{d}[k] - y[k]$. For the purpose of this description it is assumed here that the receiver has determined which of the three constellations of FIG. 11 is being transmitted, because R is different for each of these constellations. Additionally, RCCR requires knowledge of the constellation and, in particular, knowledge of the power of the corner symbols of the constellation.

Stage Switching Based on Estimate of Mean Square Error at Equalizer Output

Certain embodiments employ stage switching that is based on estimates of mean square error at the output of the equalizer. An accurate estimate of the mean square error ("MSE") of the equalizer output can be obtained from a series of errors e[k] calculated by the error calculator module 222 of FIG. 22. For example, an estimate may be obtained by using:

$$MSE[k](1-\beta)e^2[k] + \beta MSE[k-1], \tag{Eq. 4}$$

where $\beta < 1$ is a forgetting factor. Other methods for averaging e[k] are known and can be used. Eq. 4 produces a result that can be compared to a predetermined threshold and used by the stage controller module 223 of FIG. 22 to switch operation from stage 1 to stage 2 when MSE[k] drops below that threshold. It can be compared to a second predetermined threshold to switch operation from stage 2 to stage 3 when MSE[k] drops below that second threshold.

Additional Descriptions of Certain Aspects of the Invention

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Certain embodiments of the invention provide systems and methods for detecting signal disruption in a coaxial cable. In certain embodiments, the signal disruption is detected by a modem that processes video signals. In certain embodiments, the video signals are representative of a sequence of images captured by a camera. Certain embodiments comprise a demodulator that includes a frame sync generator. In certain embodiments, the frame sync generator produces a measurement of confidence of synchronization corresponding to a passband signal received from the coaxial cable. Certain embodiments comprise a gain block in an automatic gain control element of the modem. In certain embodiments, the gain block is controlled by a gain control signal produced by the automatic gain control element. Certain embodiments comprise an equalizer that adjusts a selection of filter taps to match characteristics of the coaxial cable. Certain embodiments comprise a disruption detector that generates an alarm signal based on a change in one or more of the measurement of confidence of synchronization, a change in the gain control signal, and the selection of the filter taps.

In certain embodiments, the modem transmits a different passband signal to the coaxial cable. In certain embodiments, the different passband signal is disabled when the alarm signal is generated. In certain embodiments, the disruption detector monitors a constellation detector and wherein the alarm signal is generated based on a change in a measurement of reliability provided by the constellation detector. In certain embodiments, the disruption detector is configured to generate the alarm signal upon determining that frame synchronization is lost. In certain embodiments, the disruption detector monitors an estimate of mean square error in the equalizer. In certain embodiments, the alarm signal is generated by the disruption detector when the estimate exceeds a threshold value.

In certain embodiments, a quadrature amplitude modulated passband signal is demodulated by the modem. In certain embodiments, the estimate of the mean square error is calculated from a series of error measurements in an error calculator module of the equalizer. In certain embodiments, the modem receives data encoded according to an Internet protocol. In certain embodiments, the disruption detector generates the alarm signal based on a detected dropped packet rate occurring for a predetermined period of time. In certain embodiments, the disruption detector generates the alarm signal upon detection of a loss of convergence of the equalizer. In certain embodiments, the disruption detector generates the alarm signal when the gain control signal exceeds a threshold value for a predetermined period of time.

Certain embodiments of the invention provide methods for detecting signal disruption in a coaxial cable in a modem that processes video signals transmitted by a security earners. Certain embodiments comprise producing a measurement of confidence characterizing frame synchronization in a frame sync generator of a modem that demodulates a passband signal received from the coaxial cable. Certain embodiments comprise selecting a set of filter taps in an equalizer to match transmission characteristics of the coaxial cable. Certain embodiments comprise monitoring changes in a gain control provided to a gain block in an automatic gain control element of the modem. Certain embodiments comprise selectively generating an alarm signal based on a change in one or more of the measurement of confidence of synchronization, the set of filter taps and the gain control signal. Certain embodiments comprise disabling transmission of at least one passband signal when the alarm signal is generated. In certain embodiments, generating the alarm signal includes determining that frame synchronization is lost based on a change in the measurement of confidence.

In certain embodiments, selecting a set of filter taps includes using a least mean squares algorithm in the equalizer. In certain embodiments, the modem receives Internet Protocol encoded data and further comprising generating the alarm signal based on a detected dropped packet rate over a predetermined period of time. Certain embodiments comprise generating the alarm signal upon detection of a loss of convergence of the equalizer. Certain embodiments comprise generating the alarm signal when the gain control signal exceeds a threshold value for a predetermined period of time.

Certain embodiments of the invention provide apparatus for processing signals received from a security camera. Certain embodiments comprise a demodulator that includes a frame sync generator. In certain embodiments, the frame sync generator produces a measurement of confidence of synchronization corresponding to a passband signal received from the coaxial cable. In certain embodiments, an alarm signal is generated when the measurement of confidence of synchronization drops below a predetermined threshold. Certain embodiments comprise an equalizer that adjusts a selection of filter taps to match characteristics of the coaxial cable. In certain embodiments, the alarm signal is generated when one or more of the characteristics of the coaxial cable change by a predetermined amount. Certain embodiments comprise an automatic gain control element responsive to a gain control signal. In certain embodiments, the alarm signal is generated when the gain control signal the gain control signal exceeds a predetermined threshold value. In certain embodiments, the coaxial cable carries a baseband video signal and a passband video signal produced by the camera. In certain embodiments, the modem is adapted to maintain a record of a modem configuration, including measured values and the predetermined threshold values. In certain embodiments, the record of modem configuration includes trends, averages and information related to cycles of changes in coax characteristics. In certain embodiments, the record of modem configuration includes variations in environmental conditions that result in changes to equalizer filter taps.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. A system for detecting signal disruption in a coaxial cable, wherein the signal disruption is detected by a modem that processes video signals, the video signals being representative of a sequence of images captured by a camera, and wherein the modem comprises:
   a demodulator that includes a frame sync generator, the frame sync generator producing a measurement of confidence of synchronization corresponding to a passband signal received from the coaxial cable;
   a gain block in an automatic gain control element of the modem, the gain block being controlled by a gain control signal produced by the automatic gain control element;

an equalizer that adjusts a selection of filter taps to match characteristics of the coaxial cable; and a disruption detector that generates an alarm signal based on a change in one or more of the measurement of confidence of synchronization, a change in the gain control signal, and the selection of the filter taps.

2. The system of claim 1, wherein the modem transmits a different passband signal to the coaxial cable, and wherein the different passband signal is disabled when the alarm signal is generated.

3. The system of claim 1, wherein the disruption detector monitors a constellation detector and wherein the alarm signal is generated based on a change in a measurement of reliability provided by the constellation detector.

4. The system of claim 1, wherein the disruption detector is configured to generate the alarm signal upon determining that frame synchronization is lost.

5. The system of claim 1, wherein the disruption detector monitors an estimate of mean square error in the equalizer, and wherein the alarm signal is generated by the disruption detector when the estimate of mean square error exceeds a threshold value.

6. The system of claim 5, wherein a quadrature amplitude modulated passband signal is demodulated by the modem, and wherein the estimate of the mean square error is calculated from a series of error measurements in an error calculator module of the equalizer.

7. The system of claim 1, wherein the modem receives data encoded according to an Internet protocol and wherein the disruption detector generates the alarm signal based on a detected dropped packet rate occurring for a predetermined period of time.

8. The system of claim 1, wherein the disruption detector generates the alarm signal upon detection of a loss of convergence of the equalizer.

9. The system of claim 1, wherein the disruption detector generates the alarm signal when the gain control signal exceeds a threshold value for a predetermined period of time.

10. A method for detecting signal disruption in a coaxial cable using a modem that processes video signals transmitted over the coaxial cable by a security camera, the method comprising:

producing a measurement of confidence characterizing frame synchronization in a frame sync generator of a modem that demodulates a passband signal received from the coaxial cable;

selecting a set of filter taps in an equalizer to match transmission characteristics of the coaxial cable;

monitoring changes in a gain control provided to a gain block in an automatic gain control element in the modem; and selectively generating an alarm signal based on a change in one or more of the measurement of confidence of synchronization, the set of filter taps and the gain control signal.

11. The method of claim 10, further comprising disabling transmission of at least one passband signal when the alarm signal is generated.

12. The method of claim 10, wherein generating the alarm signal includes determining that frame synchronization is lost based on a change in the measurement of confidence.

13. The method of claim 10, wherein selecting a set of filter taps includes using a least mean squares algorithm in the equalizer and wherein selectively generating the alarm signal includes generating the alarm signal when an estimate of mean square error exceeds a threshold value.

14. The method of claim 10, wherein the modem receives Internet Protocol encoded data and further comprising generating the alarm signal based on a detected dropped packet rate over a predetermined period of time.

15. The method of claim 10, further comprising generating the alarm signal upon detection of a loss of convergence of the equalizer.

16. The method of claim 10, further comprising generating the alarm signal when the gain control signal exceeds a threshold value for a predetermined period of time.

17. A modem for processing signals received from a security camera, comprising:

a demodulator that includes a frame sync generator, the frame sync generator producing a measurement of confidence of synchronization corresponding to a passband signal received from a coaxial cable, wherein an alarm signal is generated when the measurement of confidence of synchronization drops below a predetermined threshold;

an equalizer that adjusts a selection of filter taps to match characteristics of the coaxial cable, wherein the alarm signal is generated when one or more of the characteristics of the coaxial cable change by a predetermined amount; and an automatic gain control element responsive to a gain control signal, wherein the alarm signal is generated when the gain control signal exceeds a predetermined threshold value, wherein the coaxial cable carries a baseband video signal and a passband video signal produced by the camera.

18. The system of claim 17, wherein the modem is adapted to maintain a record of a modem configuration, including the measurement of confidence, the selection of filter taps and the predetermined threshold values.

19. The system of claim 18, wherein the record of modem configuration includes trends, averages and information related to cycles of changes in characteristics of the coaxial cable.

20. The system of claim 18, wherein the record of modem configuration includes variations in environmental conditions that result in changes to equalizer filter taps.

* * * * *